US008329138B2

(12) United States Patent
Tenne et al.

(10) Patent No.: US 8,329,138 B2
(45) Date of Patent: Dec. 11, 2012

(54) FULLERENE-LIKE NANOSTRUCTURES, THEIR USE AND PROCESS FOR THEIR PRODUCTION

(75) Inventors: Reshef Tenne, Rehovot (IL); Francis Leonard Deepak, Chennai (IN); Hagai Cohen, Rehovot (IL); Sidney R. Cohen, Rehovot (IL); Rita Rosentsveig, Rehovot (IL); Lena Yadgarov, Rehovot (IL)

(73) Assignee: Yeda Research and Development Company Ltd., Rehovot (IL)

( * ) Notice: Subject to any disclaimer, the term of this patent is extended or adjusted under 35 U.S.C. 154(b) by 329 days.

(21) Appl. No.: 12/721,113

(22) Filed: Mar. 10, 2010

(65) Prior Publication Data
US 2010/0227782 A1 Sep. 9, 2010

Related U.S. Application Data

(63) Continuation-in-part of application No. PCT/IL2008/001213, filed on Sep. 10, 2008.

(60) Provisional application No. 60/971,057, filed on Sep. 10, 2007.

(51) Int. Cl.
C01B 19/04 (2006.01)
C01B 17/00 (2006.01)
B01J 19/00 (2006.01)

(52) U.S. Cl. ........ 423/509; 977/773; 977/810; 977/734; 508/165; 508/108

(58) Field of Classification Search ............. 423/509; 977/773, 734, 810; 508/108, 165
See application file for complete search history.

(56) References Cited

U.S. PATENT DOCUMENTS 6,217,843 B1 * 4/2001 Homyonfer et al. ........ 423/593.1
7,641,886 B2 * 1/2010 Tenne et al. ................... 423/508

FOREIGN PATENT DOCUMENTS

WO    WO 00/66485 A1    11/2000
WO    WO 2006/106517 A2    10/2006
WO    WO 2009/034572 A1    3/2009

OTHER PUBLICATIONS

Deepak, F.L., Cohen, H., Cohen, s., Feldman, Y., Popovitz-Biro, R., Azulay, D., Millo, O., Tenne, R., J. Am. Chem. Soc. 2007, 129, 12549-12562.*
Deepak, F.L., Popovitz-Biro, R., Feldman, Y., Cohen, H., Enyashin, A., Seifert, G., Tenne, R. Chem. Asian J., 2008, 3, 158-1574.*
Tenne, "Inorganic nanotubes and fullerene-like particles," Nature Nanotech., 2006, vol. 1, Abstract.
Tenne et al., "Polyhedral and cylindrical structures of tungsten disulphide," Nature, 1992, vol. 360, pp. 444-446.

(Continued)

Primary Examiner — Jim Goloboy
(74) Attorney, Agent, or Firm — Oliff & Berridge, PLC

(57) ABSTRACT

A nanostructure, being either an Inorganic Fullerene-like (IF) nanostructure or an Inorganic Nanotube (INT), having the formula $A_{1-x}$-$B_x$-chalcogenide are described. A being a metal or transition metal or an alloy of metals and/or transition metals, B being a metal or transition metal B different from that of A and x being $\leq 0.3$. A process for their manufacture and their use for modifying the electronic character of A-chalcogenide are described.

3 Claims, 25 Drawing Sheets

Various metal precursors suitable for the synthesis of the doped IF nanoparticles

| Name | Formula | mp. °C | bp. °C |
|---|---|---|---|
| Hafnium chloride | HfCl$_4$ | 432 (tp) | 317 (sp) |
| Molybdenum carbonyl | Mo(CO)$_6$ | 150 (dec) | subl |
| Molybdenum (V) chloride | MoCl$_5$ | 194 | 268 |
| Molybdenum (V) flouride | MoF$_5$ | 67 | 213 |
| Molybdenum (V)oxytrichloride | MoOCl$_3$ | 297 | Subl |
| Molybdenum (VI) fluoride | MoF$_6$ | 17.5 | 34 |
| Niobium (V) chloride | NbCl$_5$ | 204.7 | 254 |
| Niobium (V) fluoride | NbF$_5$ | 80 | 229 |
| Platinum (VI) fluoride | PtF$_6$ | 61.3 | 69.1 |
| Rhenium (VI)oxytetrachloride | ReOCl$_4$ | 29.3 | 223 |
| Ruthenium (IV) fluoride | RuF$_4$ | 86.5 | 227 |
| Tantalum (V) chloride | TaCl$_5$ | 216 | 239.35 |
| Titanium (IV) bromide | TiBr$_4$ | 39 | 230 |
| Titanium (IV) chloride | TiCl$_4$ | -25 | 136.45 |
| Tungsten carbonyl | W(CO)$_6$ | 170 (dec) | Subl |
| Tungsten (V) bromide | WBr$_5$ | 286 | 333 |
| Tungsten (V) chloride | WCl$_5$ | 242 | 286 |
| Tungsten (VI) chloride | WCl$_6$ | 275 | 246.75 |
| Tungsten (VI) fluoride | WF$_6$ | 2.3 | 17 |
| Tungsten (VI)oxytetrabromide | WOBr$_4$ | 277 | 327 |
| Tungsten (VI)oxytetrachloride | WOCl$_4$ | 211 | 227.55 |
| Tungsten (VI)oxytetrafluoride | WOF$_4$ | 106 | 186 |
| Vanadium (IV) chloride | VCl$_4$ | -25.7 | 148 |
| Vanadium (V) fluoride | VF$_5$ | 19.5 | 48.3 |
| Vanadyl trichloride | VOCl$_3$ | -79 | 127 |
| Vanadyl trifluoride | VOF$_3$ | 300 | 480 |
| Zirconium chloride | ZrCl$_4$ | 437 (tp) | 331 (sp) |
| Zirconium fluoride | ZrF$_4$ | 932 (tp) | 912 (sp) |
| Zirconium iodide | ZrI$_4$ | 499 (tp) | 431 (sp) |

Abbreviations: (dec) – decomposes; (sp) – sublimation point; (subl) – sublimes; (tp) – triple point IF – nanoparticles with possible p-type or n-type dopants

| p-type dopant | IF nanoparticle | n-type dopant |
|---|---|---|
| Nb | MoS$_2$ | Re |
| Ta | WS$_2$ | Re |
| W | ReS$_2$ | Os |
| Sc | TiS$_2$ | V |
| Y | ZrS$_2$ | Nb |
| La | HfS$_2$ | Ta |
| Hf | TaS$_2$ | W |
| Ir | PtS$_2$ | Au |
| Mn | RuS$_2$ | Rh |
| Ru | RhS$_2$ | Pd |

OTHER PUBLICATIONS

Feldman et al., "High-Rate, Gas-Phase Growth of $MoS_2$ Nested Inorganic Fullerenes and Nanotubes," Science, 1995, vol. 267, Abstract.
Etzkorn at al., "Metal-Organic Chemical Vapor Deposition Synthesis of Hollow Inorganic-Fullerene-Type $MoS_2$ and $MoSe_2$ Nanoparticles," Advanced Materials, 2005, vol. 17, pp. 2372-2375.
Zak et al., "Alkali Metal Intercalated Fullerene-Like $MS_2$ (M = W, Mo) Nanoparticles and Their Properties," J. Am. Chem. Soc. 2002, vol. 124, No. 17, Abstract.
Ivanovskaya et al., "Structure, stability and electronic properties of composite $Mo_{1-x}Nb_xS_2$," Phys. Stat. Sol. B: Basic Solid State Physics, 2006, vol. 243, No. 8, Abstract.
Schuffenhauer et al., "Synthesis of Fullerene-Like Tantalum Disulfide Nanoparticles by a Gas-Phase Reaction and Laser Ablation," Small, 2005, vol. 1, No. 11, Abstract.
Margolin et al., "Inorganic fullerene-like Nanoparticles of $TiS_2$," Chemical Physics Letters, 2005, vol. 411, Nos. 1-3, Abstract.
Scheffer et al., "Scanning tunneling microscopy study of $WS_2$ nanotubes," Phys. Chem. Chem. Phys., 2002, vol. 4, pp. 2095-2098.
Yang et al., "Restocking exfoliated layered compounds," Mol. Liq. Cryst., 1994, vol. 244, Abstract.
Zhu et al., "Tungsten-niobium-sulfur composite nanotubes," Chem. Commun., 2001, pp. 121-122.
Hsu et al., "Titanium-Doped Molybdenum Disulfide Nanostructures," Adv. Funet. Mater., 2001, vol. 11, No. 1, pp. 69-74.
Nath et al., "$Mo_{1-x}W_xS_2$ nanotubes and related structures," Chem. Phys. Lett., 2002, vol. 352, Nos. 3-4, Abstract.
Brorson et al., "Rhenium(IV) Sulfide Nanotubes," J. Am. Chem. Soc., 2002, vol. 124, Abstract.
Tiong el al., "Temperature dependence piezoreflectance study of the effect of doping $MoS_2$ with rhenium," J. Phys. Condens. Matter., 2000, vol. 12, Abstract.
Biswas et al., "Metallic $ReO_3$ Nanoparticles," J. Phys. Chem. B, 2006, vol. 842, Abstract.
Deepak et al., "Fullerene-like (IF) $Nb_xMo_{1-x}S_2$ nanoparticles", Journal of the American Chemical Society, 2007, vol. 129, No. 41, pp. 12549-12562.
Zhu et al, "Nb-doped $WS_2$ nanotubes" Chemical Physics Letters, Jul. 6, 2001, vol. 342, Nos. 1-2, pp. 15-21.
Deepak et al, "$MoS_2$ Fullerene-like Nanopartioles and Nanotubes using Gas-Phase Reaction with $MoCl_5$", NANO, vol. 1, No. 2, Sep. 2006, pp. 167-180.
Schuffenhauer et al., "Synthesis of $NbS_2$ nanoparticles with (nested) fullerene-like structure (*IF*)" Journal of Materials Chemistry, vol. 12, No. 1, Jan. 2002, pp. 1587-1591.
Tenne, "Doping control for nanotubes" Nature, vol. 431, Oct. 7, 2004, pp. 640-641.
Feldman et al. "New reactor for production of tungsten disulfide hollow onion-like (inorganic fullerene-like) nanoparticles" Solid State Sciences, 2000, pp. 663-672.
Margulis et al., "Nested fullerene-like structures", Nature, vol. 356, Sep. 9, 1993, pp. 113-114.
Deepak et al., "Fullerene-like $Mo(W)_{1-x}Re_xS_2$ Nanoparticles", Chem. Asian J., 2008, vol. 3, pp. 1568-1574.
International Search Report issued in PCT/IL/2008/001213, mailed Feb. 2, 2009.

* cited by examiner

Various metal precursors suitable for the synthesis of the doped IF nanoparticles

| Name | Formula | mp. °C | bp. °C |
|---|---|---|---|
| Hafnium chloride | $HfCl_4$ | 432 (tp) | 317 (sp) |
| Molybdenum carbonyl | $Mo(CO)_6$ | 150 (dec) | subl |
| Molybdenum (V) chloride | $MoCl_5$ | 194 | 268 |
| Molybdenum (V) flouride | $MoF_5$ | 67 | 213 |
| Molybdenum (V)oxytrichloride | $MoOCl_3$ | 297 | Subl |
| Molybdenum (VI) fluoride | $MoF_6$ | 17.5 | 34 |
| Niobium (V) chloride | $NbCl_5$ | 204.7 | 254 |
| Niobium (V) fluoride | $NbF_5$ | 80 | 229 |
| Platinum (VI) fluoride | $PtF_6$ | 61.3 | 69.1 |
| Rhenium (VI)oxytetrachloride | $ReOCl_4$ | 29.3 | 223 |
| Ruthenium (IV) fluoride | $RuF_4$ | 86.5 | 227 |
| Tantalum (V) chloride | $TaCl_5$ | 216 | 239.35 |
| Titanium (IV) bromide | $TiBr_4$ | 39 | 230 |
| Titanium (IV) chloride | $TiCl_4$ | -25 | 136.45 |
| Tungsten carbonyl | $W(CO)_6$ | 170 (dec) | Subl |
| Tungsten (V) bromide | $WB_{l5}$ | 286 | 333 |
| Tungsten (V) chloride | $WCl_5$ | 242 | 286 |
| Tungsten (VI) chloride | $WCl_6$ | 275 | 246.75 |
| Tungsten (VI) fluoride | $WF_6$ | 2.3 | 17 |
| Tungsten (VI)oxytetrabromide | $WOBr_4$ | 277 | 327 |
| Tungsten (VI)oxytetrachloride | $WOCl_4$ | 211 | 227.55 |
| Tungsten (VI)oxytetrafluoride | $WOF_4$ | 106 | 186 |
| Vanadium (IV) chloride | $VCl_4$ | -25.7 | 148 |
| Vanadium (V) fluoride | $VF_5$ | 19.5 | 48.3 |
| Vanadyl trichloride | $VOCl_3$ | -79 | 127 |
| Vanadyl trifluoride | $VOF_3$ | 300 | 480 |
| Zirconium chloride | $ZrCl_4$ | 437 (tp) | 331 (sp) |
| Zirconium fluoride | $ZrF_4$ | 932 (tp) | 912 (sp) |
| Zirconium iodide | $ZrI_4$ | 499 (tp) | 431 (sp) |

Abbreviations: (dec) – decomposes; (sp) – sublimation point; (subl) – sublimes; (tp) – triple point

FIG. 1A

IF – nanoparticles with possible p-type or n-type dopants

| p-type dopant | IF nanoparticle | n-type dopant |
|---|---|---|
| Nb | $MoS_2$ | Re |
| Ta | $WS_2$ | Re |
| W | $ReS_2$ | Os |
| Sc | $TiS_2$ | V |
| Y | $ZrS_2$ | Nb |
| La | $HfS_2$ | Ta |
| Hf | $TaS_2$ | W |
| Ir | $PtS_2$ | Au |
| Mn | $RuS_2$ | Rh |
| Ru | $RhS_2$ | Pd |

FIG. 1B

IF-nanoparticles with possible magnetic dopants/impurities

| Dopants | IF nanoparticle |
|---|---|
| Mn/Co/Ni/Fe | $MoS_2$ |
| Mn/Co/Ni/Fe | $WS_2$ |
| Mn/Co/Ni/Fe | $ReS_2$ |
| Mn/Co/Ni/Fe | $TiS_2$ |
| Mn/Co/Ni/Fe | $ZrS_2$ |
| Mn/Co/Ni/Fe | $HfS_2$ |
| Mn/Co/Ni/Fe | $TaS_2$ |

FIG. 1C d = 6.4 V

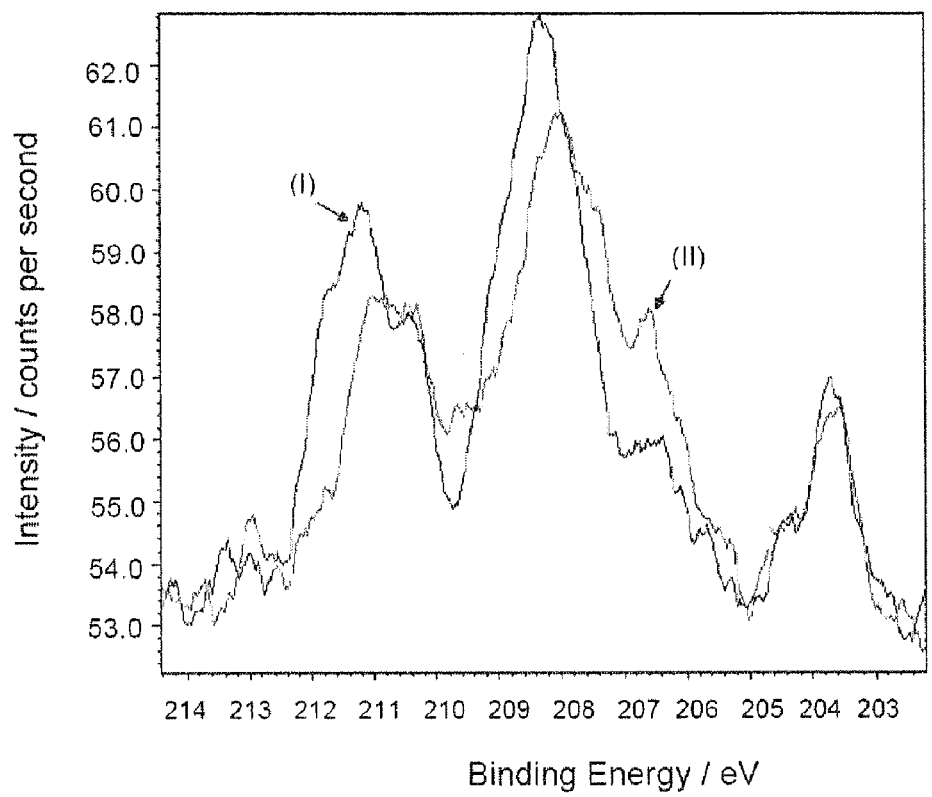
FIG. 10A
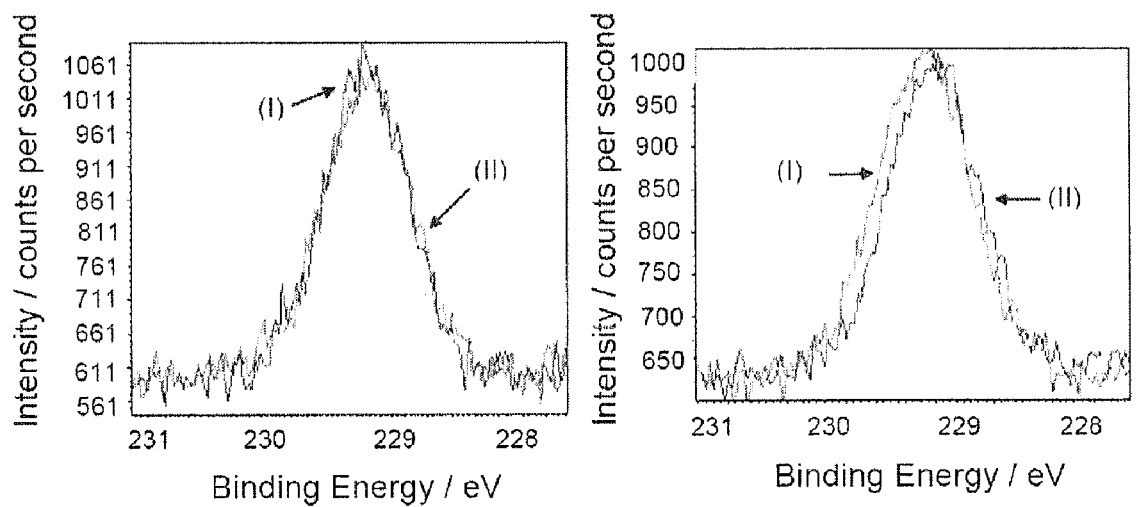
FIG. 10B
FIG. 10C

Horizontal Reactor

Auxiliary/Precursor Furnace

FULLERENE-LIKE NANOSTRUCTURES, THEIR USE AND PROCESS FOR THEIR PRODUCTION

This is a Continuation-in-Part of International Application No. PCT/IL2008/001213 filed Sep. 10, 2008, which claims the benefit of U.S. Provisional Application No. 60/971,057 filed Sep. 10, 2007. The disclosure of the prior applications is hereby incorporated by reference herein in its entirety.

FIELD OF THE INVENTION

This invention relates to fullerene-like nanoparticles, their use and a method of manufacturing such particles.

BACKGROUND OF THE INVENTION

The following references are considered to be pertinent for the purpose of understanding the background of the present invention:

(1) Tenne, R. *Nature Nanotech.* 2006, 1, 103.
(2) Tenne, R, Margulis, L., Genut M. & Hodes, G. *Nature* 1992, 360, 444.
(3) Feldman, Y., Wasserman, E., Srolovitz D. J. & Tenne R. *Science* 1995, 267, 222.
(4) (a) Deepak, F. L.; Margolin, A.; Wiesel, I.; Bar-Sadan, M.; Popovitz-Biro, R.; Tenne, R. *Nano* 2006, 1, 167.
(b) Etzkorn, J.; Therese, H. A.; Rocker, F.; Zink, N.; Kolb, Ute.; Tremel, W. *Adv. Mater.* 2005, 17, 2372.
(5) Zak, A.; Feldman, Y.; Lyakhovitskaya, V.; Leitus, G.; Popovitz-Biro, R.; Wachtel, E.; Cohen, H.; Reich, S.; Tenne, R. *J. Am. Chem. Soc.* 2002, 124, 4747.
(6) Ivanovskaya, V. V.; Heine, T.; Gemming S.; Seifert, G. *Phys. Stat. Sol. B: Basic Solid State Physics* 2006, 243, 1757.
(7) Schuffenhauer, C.; Popovitz-Biro R.; Tenne, R. *J. Mater. Chem.* 2002, 12, 1587.
(8) Schuffenhauer, C.; Parkinson, B. A.; Jin-Phillipp, N.Y.; Joly-Pottuz, L.; Martin, J.-M.; Popovitz-Biro R.; Tenne, R. *Small* 2005, 1, 1100.
(9) Margolin, A.; Popovitz-Biro, R.; Albu-Yaron, A.; Rapoport L.; Tenne, R. *Chem. Phys. Lett.* 2005, 411, 162.
(10) Seifert, G.; Köhller, T.; Tenne, R. *J. Phys. Chem. B.* 2002, 106, 2497.
(11) Scheffer, L.; Rosentzveig, R.; Margolin, A.; Popovitz-Biro, R.; Seifert, G.; Cohen, S. R.; Tenne, R. *Phys. Chem. Chem. Phys.* 2002, 4, 2095.
(12) Yang, D.; Frindt, R. F. *Mol. Liq. Cryst.,* 1994, 244, 355;
(13) (a) Zhu, Y. Q.; Hsu, W. K.; Terrones, M.; Firth, S.; Grobert, N.; Clark, R. J. H.; Kroto H. W.; Walton, D. R. M. *Chem. Commun.* 2001, 121;
(b) Hsu, W. K.; Zhu, Y. Q.; Yao, N.; Firth, S.; Clark, R. J. H.; Kroto H. W.; Walton, D. R. M. *Adv. Fund. Mater.* 2001, 11, 69;
(c) Nath, M.; Mukhopadhyay, K.; Rao, C. N. R. *Chem. Phys. Lett.* 2002, 352, 163;
(14) K. S. Coleman, J. Sloan, N. A. Hanson, G. Brown, G. P. Clancy, M. Terrones, H. Terrones and M. L. H. Green, *J. Am. Chem. Soc.* 2002, 124, 11580.
(15) M. Brorson, T. W. Hansen, and C. J. H. Jacobsen, *J. Am. Chem. Soc.* 2002, 124, 11582.
(16) K. K Tiong, T. S. Shou and C. H. Ho, *J. Phys. Condens. Matter.* 2000, 12, 3441.
(17) K. Biswas, C. N. R. Rao *J. phys. Chem. B* 2006 110, 842.
(18) Y. Feldman et al., *Solid State Sci.,* 2, 663 (2000).

$MoS_2$ and $WS_2$ are quasi two dimensional (2D) compounds. Atoms within a layer are bound by strong covalent forces, while individual layers are held together by van der Waals (vdW) interactions. The stacking sequence of the layers can lead to the formation of a hexagonal polymorph with two layers in the unit cell (2H), rhombohedral to with three layers (3R), or trigonal with one layer (1T). The weak interlayer vdW interactions offer the possibility of introducing foreign atoms or molecules between the layers via intercalation. Furthermore, $MoS_2$, $WS_2$ and a plethora of other 2D compounds are known to form closed cage structures which are referred to as inorganic fullerene-like (IF) and inorganic nanotubes (INT), analogous to structures formed from carbon [1]. One of the initial methods of synthesis of IF-$MoS_2$ and IF-$WS_2$ involved starting from the respective oxide nanoparticles [2, 3]. Subsequently synthesis of IF-$NbS_2$ and IF-$MoS_2$ using a gas-phase reaction starting from $MoCl_5$ and $NbCl_5$, respectively, and $H_2S$ has been demonstrated [4a, 7]. A similar strategy for the synthesis of IF-$MoS_2$ nanoparticles using the gas phase reaction between $Mo(CO)_6$ and sulfur, has been reported [4b]. The two kinds of reactions progress along very different paths, which has a large effect on the topology of the closed-cage nanoparticles. The conversion of the metal-oxide nanoparticles to sulfides (IF) starts on the surface of the nanoparticles progressing gradually inwards in a slow diffusion-controlled fashion. Contrarily, the gas-phase reaction proceeds by a nucleation and growth mode starting from, e.g. a small $MoS_2$ nuclei and progressing outwards rather rapidly.

Modification of the electronic properties of layered-type semiconductors can be accomplished either by intercalation of foreign atoms in the host lattice, or by doping/alloying process of the semiconductor. In the intercalation process alkali or another moiety like amine diffuses into the van der Waals gap between each two layers. Once it resides in the proper site it donates its valence electron to the host lattice making it n-type conductor. In the case of doping and alloying the metal atoms go into the layer itself substituting the host transition metal atom. If the substituting atom (e.g. Nb) has one less electron in its outer shell than the host metal atom (Mo), the lattice becomes p-doped. If the substituting metal atom has one extra electron (Re), the lattice becomes n-type. Doping is usually limited to below 1% substitution. In the case of alloying, the guest atoms come in significant concentrations (>1%). If the percolation limit is surpassed (e.g. $Mo_{0.75}Nb_{0.25}S_2$) the lattice becomes essentially metallic.

Following the successful synthesis of the IF nanoparticles and inorganic nanotubes, foreign atoms have been incorporated into their lattice by intercalation of IF nanoparticles. For instance, IF nanoparticles of $MoS_2$ and $WS_2$ were intercalated by exposure to alkali metal (potassium and sodium) vapor using a two-zone transport method [5]. Alloying or doping of inorganic nanotubes has been reported for specific cases of Ti-doped $MoS_2$ nanotubes, Nb-doped $WS_2$ nanotubes [13(a), (b)]. In addition, W-alloyed $MoS_2$ nanotubes have been synthesized by varying the W:Mo ratio [13(c)].

The effect of Nb substitution on the electronic structure of $MoS_2$ was investigated theoretically using density functional tight binding method (DFTB) [6]. However, no scientific and experimental confirmation for the control of electrical properties of either nanotubes or fullerene-like nanoparticles by alloying/doping was reported. The intercalation in these compounds is mediated by their structure and can bring about significant changes in their structure and their physical properties. By varying the intercalant and its concentration, a large number of compounds with different properties can be prepared. The intercalation reaction is generally accompanied by charge transfer between the intercalating species and the host layer, which serves as the driving force for the intercalation reaction. The transition metal dichalcogenides only form intercalation complexes with electron donor species, so the process here is of electron transfer from the guest moiety to the host lattice. Such process can be used to 'fine tune' the electronic properties of the host material in a controllable way. It is thus possible to achieve semiconductor-to-metal transitions with intercalation. It must be born in mind though that the intercalated nanoparticles are very sensitive to the ambient atmosphere and generally loose their unique electrical properties after short exposure to the atmosphere.

SUMMARY OF THE INVENTION

The present invention is based on the synthesis and formation of mixed phase nanostructures of the general structural formula $A_{1-x}$-$B_x$-chalcogonides and elucidating their structural and electronic properties. The nanostructure of the present invention may include either inorganic fullerene-like (IF) nanostructure or an inorganic nanotube (INT); the invention concerns also a composition containing both the IF nanostructure and INT of the above formula. B is incorporated into the lattice of the A-chalcogenide altering its characteristics inter cilia as a function of the nature of A, B and the amount of incorporated B, i.e. the value of x in the $A_{1-x}$-$B_x$-chalcogenide lattice. The incorporation of $B_x$ into the lattice of the A-chalcogonide produces changes in the electronic properties leading to the formation of high conductivity semiconductors or even metal and metal-like nanoparticles from a previously known semiconductor (i.e. the selected A-chalcogonide).

Thus the present invention is directed to inorganic fullerene-like (IF) nanostructure and inorganic nanotubes of the formula $A_{1-x}$-$B_x$-chalcogenide, wherein A is either a metal/transition metal or an alloy of such metals/transition metals, B is a metal or transition metal, and x being $\leq 0.3$ provided that: A≠B. Although in the description below the nanostructures of the invention are mainly referred to as IF nanostructures, it should be understood that the material compositions of the nanostructures described below are relevant for the INTs as well.

The compound A may be a metal or transition metal or an alloy of metals or transition metals selected from the following: Mo, W, Re, Ti, Zr, Hf, Nb, Ta, Pt, Ru, Rh, In, Ga, InS, InSe, GaS, GaSe, WMo, TiW. The compound B is also a metal or transition metal selected from the following: Si, Nb, Ta, W, Mo, Sc, Y, La, Hf, Ir, Mn, Ru, Re, Os, V, Au, Rh, Pd, Cr, Co, Fe, Ni. Within the nanostructure, B and/or B-chalcogonide are incorporated within the $A_{1-x}$-chalcogenide. The chalcogenide is selected from the S, Se, Te. For example, IF nanostructure of the invention may be IF-$Mo_{1-x}Nb_xS_2$, IF-$Mo(W)_{1-x}Re_xS_2$, the alloys of $WMoS_2$, $WMoSe_2$, $TiWS_2$, $TiWSe_2$, where Nb or Re are doped therein. Within the alloys of the invention, taking WMo, TiW for example, the ratio between W and Mo or Ti and W may be 0.65-0.75 of one metal or transition metal and 0.25-0.35 of the other metal or transition metal, e.g. $W_{0.7}Mo_{0.29}Nb_{0.01}S_2$ (given with the percentage of the Nb dopant).

By incorporated it is meant that the B and/or B-chalcogonide are doped or alloyed uniformly within the $A_{1-x}$-chalcogenide lattice. The B and/or B-chalcogenide substitute the A atom within the lattice. Such substitution may be continuous or alternate substitutions. Continuous substitution are spreads of A and B within each layer alternating randomly (e.g. $(A)_n$-$(B)_n$, n>1). Depending on the concentration of incorporated B, it may replace a single A atom within $A_{1-x}$-chalcogenide matrix forming a structure of ( . . . A)n-B-(A) n-B . . . ). Alternate substitution means that A and B are alternately incorporated into the $A_{1-x}$-chalcogenide lattice ( . . . A-B-A-B . . . ). It should be noted that other modes of substitution of the B in the A-chalcogenide lattice are possible according to the invention. Since the A-chalcogenide has a layered structure, the substitution may be done randomly in the lattice or every 2, 3, 4, 5, 6, 7, 8, 9 or 10 layers.

The present invention is further directed to a process for the synthesis of the inorganic fullerene-like (IF) nanostructures as well as inorganic nanotubes (INT) of the general structural formula $A_x$-$B_x$-chalcogonides.

In accordance with the present invention A-$Y_1$ and B-$Y_2$ compositions each in vapor phase, where $Y_1$ and $Y_2$ are independently halogens (i.e. may or may not be the same) selected from chlorine, bromine or iodine are employed. The A-$Y_1$ and B-$Y_2$ vapors are flown into a reaction chamber together with the aid of a forming gas containing a reducing agent and an inert carrier gas. In the chamber the combined gas stream meets in an opposite direction a flow of a chalcognide carrying reacting gas, thereby causing occurrence of reduction of the A and B metals or transition metals followed by a reaction with the chalcognide carrying reacting gas resulting in the formation of said nanostructures.

Preferably, the A-$Y_1$ and B-$Y_2$ compositions in the vapor phase are prepared by evaporating A-$Y_1$ and B-$Y_2$ compositions in a chamber separate from the reaction chamber. A common or separate evaporation chambers may be used for preparation of vapors of the A-$Y_1$ and B-$Y_2$ compositions.

In accordance with the present invention, the metal or transition metal A-chalcogenide precursor may be a semiconductor of a certain electrical conductivity. Upon the insertion of an appropriate B element, the resulting IF nano structure produced from said precursor has a higher electrical conductivity. Thus, the invention provides for manufacture of a nanostructured electrical conductor, or generally speaking provides for electronic modifications by the incorporation of B into the lattice of the A-chalcognide precursor. In accordance with the present invention, the metal atom B substitutes the metal A in the original lattice. Generically, atom B may have one extra valence electron or may be deficient in one such electron compared to the original A metal atom leading to n-type (donor) and p-type (acceptor) conductivity.

Thus, the present invention is further directed to novel donor composition (electron conductors) formed by IF-nanostructures, e.g. Re doped IF-$MoS_2$ and IF-$WS_2$, and novel acceptors (hole conductors), e.g. Nb doped IF-$MoS_2$ and IF-$WS_2$. Other possible donor or acceptors according to the present invention are InS doped with Si being p-type or GaSe, InSe doped with Zn or Cd being n-type conductors.

As indicated above, the invention also provides a composition comprising a plurality of the nanostructures of claim 1 including the IF and INT nanostructures. This may for example be a composition comprising $MoS_2$ nanoparticles and nanotubes doped by Nb, Re; or a composition comprising $WS_2$ nanoparticles and nanotubes doped by Nb, Re.

Due to the above described tribological properties of the nanostructures of the present invention the above composition(s) may be used in a shock absorber device. Due to the electrical properties of the nanostructures of the present invention, the above composition(s) may be used in a sensor device for chemical or electromechanical type sensing.

Thus, according to yet another aspect of the invention, there is provided a process for the manufacture of nanostructures including Inorganic Fullerene-like (IF) nanostructures and/or inorganic nanotubes (INT) each having the formula $A_{1-x}$-$B_x$-chalcogenide wherein A is a metal or transition metal or an alloy of one metals or transition metals including at least one of the following: Mo, W, Re, Ti, Zr, Hf, Nb, Ta, Pt, Ru, Rh, In, Ga, InS, InSe, GaS, GaSe, WMo, TiW; B is a metal or transition metal selected from the following: Si, Nb, Ta, W, Mo, Sc, Y, La, Hf, Ir, Mn, Ru, Re, Os, V, Au, Rh, Pd, Cr, Co, Fe, Ni; and $x \leqq 0.3$, provided that within said nanostructure $A \neq B$; and having B and B-chalcogenide doped within the $A_{1-x}$-chalcogenide; the process comprising:

providing $A$-$Y_1$ and $B$-$Y_2$ compositions each in vapor phase, $Y_1$ and $Y_2$ being the same or different halogens selected from chlorine, bromine or iodine;

flowing said $A$-$Y_1$ and $B$-$Y_2$ vapors together with a reducing agent carrying forming gas into a reaction chamber where they meet an opposite direction flow of a chalcogenide carrying reacting gas, thereby causing occurrence of reduction of the A and B metals or transition metals followed by a reaction with the chalcogenide carrying reacting gas resulting in the formation of said nanostructures.

The above method may be used for the formation of a nanostructured electrical conductor.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1A-1C show three tables presenting, respectively, various metal precursors suitable for the synthesis of the doped IF nanoparticles; IF-nanoparticles with possible p-type or n-type dopants; and IF-nanoparticles with possible magnetic dopants/impurities.

(FIG. 5D) shows the EDS spectra of the IF-Mo$_{1-x}$Nb$_x$S$_2$ nanoparticle in (FIG. 5C).

(FIG. 8A) Zero-loss image; (FIG. 8B) Sulfur map measured around the S L$_{2,3}$ edge (167-187 eV); (FIG. 8C) Niobium map measured around the Nb L$_3$ edge (2370-2470 eV); (FIG. 8D) Oxygen map measured around the O K edge (532-562 eV).

FIGS. 10A-10C demonstrate electrically induced line shifts of the XPS lines in the CREM mode: (FIG. 10A) Nb(3d), (FIG. 10B) Mo (3d$_{5/2}$) in IF-Mo$_{1-x}$Nb$_x$S$_2$ nanoparticles, (FIG. 10C) Mo (3d$_{5/2}$) in IF-MoS$_2$ nanoparticles. In all panels, curve (I) corresponds to 'eFG off' (electron flood gun off) conditions and curve (II) refers to 'eFG on'. Note that (panel FIG. 10A) the oxidized Nb exhibits a large shift while the reduced Nb signal is practically not shifted at all. Comparison of panels (FIG. 10B) and (FIG. 10C) demonstrates the effect of Nb substitution on the Mo line shift, indicating improved conductance in the IF-Mo$_{1-x}$Nb$_x$S$_2$ nanoparticles as compared to the undoped IF-MoS$_2$ nanoparticles.

FIGS. 14A and 14B show HRTEM images of IF-Mo$_{1-x}$Re$_x$S$_2$ nanoparticles synthesized at 850° C. FIG. 14C show the EDS spectra of the IF-Mo$_{1-x}$Re$_x$S$_2$ nanoparticles shown in 14B.

FIGS. 15A and 15B are, respectively, the TEM and the EDS spectra of the IF-Mo$_{1-x}$Re$_x$S$_2$ nanoparticles synthesized at $T_1$=800° C., FIG. 15C is the individual HRTEM image of the IF-Mo$_{1-x}$Re$_x$S$_2$ nanoparticles synthesized at $T_1$=900° C.; and FIG. 15D shows the HRTEM images of IF-W$_{1-x}$Re$_x$S$_2$ nanoparticle synthesized at $T_1$=900° C.

FIG. 18A and FIG. 18B show HRTEM images of elongated and faceted nanoparticles, respectively; FIG. 18C shows the EDS spectra of the synthesized nanoparticles. FIG. 18D gives a "ruler" for elucidating the dimensions of the obtained nanoparticles.

FIG. 21A shows a scanning electron microscope (SEM) of the formed nanoparticles; FIG. 21B shows transmission electron microscopy (TEM) of the formed nanoparticles.

DETAILED DESCRIPTION OF EMBODIMENTS

Figure 2A:
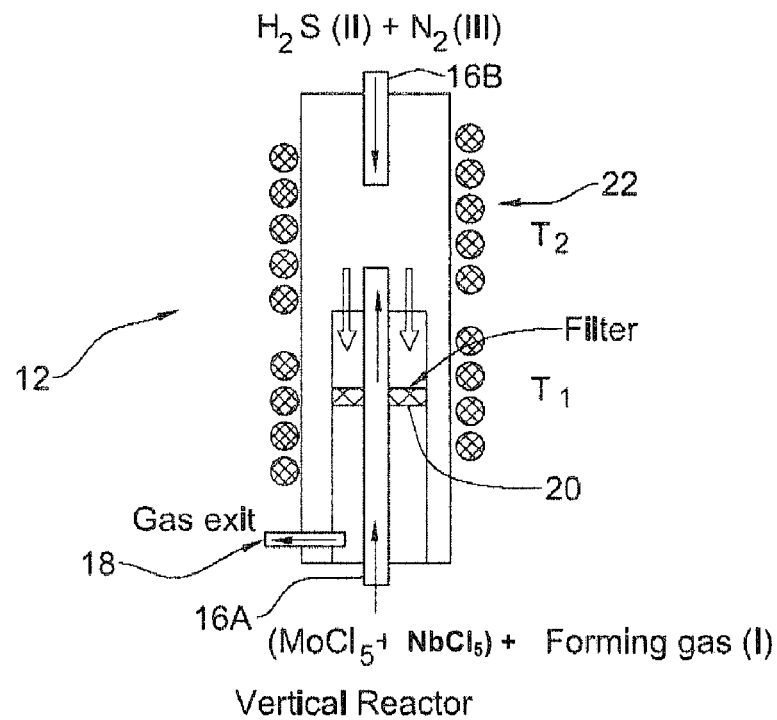
FIGS. 2A-2B is an example of an apparatus suitable for the manufacture of IF-nanostructures of the present invention including a main reactor (FIG. 2A) and a separate auxiliary furnace (FIG. 2B).

The present invention is aimed at providing inorganic IF nanostructures and inorganic nanotubes (INT) and their mixtures of the formula $A_{1-x}$-$B_x$-chalcogenide, where A is a metal or transition metal or is an alloy of metals or transition metals doped by another metal or transition metal B different from A, and x does not exceed 0.3. Depending on the chemical differences between the nature of the A and B within a particular $A_{1-x}$-B-chalcogenide lattice, and in particular, the crystalline structure of A-chalcogenide vs. B or B-chalcogenide, the concentration of B, i.e. the value of x vary. In case A-chalcognide and B-chalcognide crystallize in a similar habit, x values may be in the range of up to 0.25, or even larger. More particularly, values of up to 0.08 to 0.12, more particularly, 0.1 to 0.15 were obtained in accordance with the present invention. In case A-chalcogenide and B-chalcogenide crystallize in a dissimilar lattice habit, x may have much lower values, in the range of less than about 0.05. In particular, x values in accordance with such a case are up to 0.001 to 0.01 or 0.03.

Doping of IF and INT enables use of Mo/WS$_2$ nanostructures for semiconducting nanoelectronic devices, such as transistors, energy generators (solar cells), nanosensors (e.g., in medical devices), and as a conductive phase in nanocomposites with numerous potential applications. Indeed, the band gap of MoS$_2$ nanotubes is similar to that of silicon: 0.89-1.07 eV, versus 1.17 eV for silicon. At the same time, S—Mo—S layers with coordinatively saturated surfaces are much more resistant against oxidation and humidity than silicon or other semiconductors of the groups IV, III-V, II-VI. A nanocomposite comprising nanostructures of the invention may be in the form of a matrix with the nanostructures embedded therein.

Furthermore, Re (Nb) doped IF-WS$_2$ and IF-MoS$_2$ nanostructures (e.g. nanoparticles) exhibit improved tribological behavior. Since the doped nanoparticles are highly conductive, they tend to repel each other and disperse better in the suspension. Furthermore, they exhibit smaller tendency to entrain in the contact area, allowing them to move and role freely. These properties enable use of the nanoparticles of the present invention in lubricant compositions (nanocomposites with self-lubricating behavior, e.g. being fluids or films). For example, the nanostructures are embedded in a matrix (solid or liquid) in an appropriate amount or concentration to provide efficient lubrication.

It should be understood that IF and INT nanostructures of the present invention could be used in various applications, including conventional silicon-based applications, because of a possibility of n- or p-type doping of these nanostructures like for silicon.

As indicated above, doped IF nanostructures reveal superior solid lubricant behavior. The (Re,Nb) doped IF nanoparticles may exhibit improved tribological behavior for two reasons. Their excess free carriers allow them to repel each other, thus minimizing their tendency to agglomerate. Furthermore, the IF nanoparticles can accumulate extra charge during the tribological action. This extra charge may lead to their rapid chemical deterioration. However, the doped nanoparticles will more easily get rid of this extra charge, making them chemically more stable than the undoped ones. It should, however, be noted that excess doping might lead to extra strain and imperfections, like edge or misfit dislocations, in the structure of the IF (INT) nanoparticles. It is therefore preferable to control the doping level to avoid excess doping, e.g. so as not exceed 1 at % or preferably be below 0.1 at % concentration.

Due to their hollow structure, the IF and INT nanostructures of the present invention may further be used for absorbing kinetic energy for alleviating various kinds of shocks (like shocks occurring by car accidents) and interactions between moving particles. The composition of the present invention formed by the above-described nanostructures may thus be used as or within a so-called "shock absorber" device.

In the case of the inorganic nanotubes (INT), many of their potential device applications require high carrier density in order for them to easily transport charge and establish semiconducting (p-n or Schottky) junctions. This makes the p and n-doping of the nanotubes relevant to their future applications, e.g. as chemical or electromechanical sensor devices. However, excess doping may not only hamper the perfect crystallinity of the nanotubes, but may also lead to degeneracy, i.e. the Fermi level will go into the conduction (valence) band of the semiconductor nanotubes. In this case, they become semimetallic and would be not suitable for many electronic applications. Therefore, controlled doping according to the present invention enables to obtain engineered-like materials, where the amount of dopant is predetermined leading to nanostructures having improved electronic properties.

It should be noted that when the concentration of a dopant (i.e. component B in $A_{1-x}B_xS_2$) is not larger than at 1%, the B atoms are generally distributed as single atoms randomly in the lattice of the host. In this case, the properties of the A-chalcognide lattice (like the energy gap) are preserved. Each guest atom (B) contributes an electron (donor) or hole (acceptor) and the carrier density of the host lattice is thereby modified. Under these conditions, the best control over the conductivity and tunability over the physical properties of the A-chalcogenide lattice is accomplished. When the concentration of the guest-B is larger than about 1%, clusters of B atoms and even regions of a sublattice-B-chalcogenide within the host lattice-A-chalcogenide are formed, in which case many of the physical properties of the lattice (like energy gap) are determined by the two sublattices according to some mixture rules. If the enthalpy of the two A-chalcogenide and B-chalcogenide compounds are very different, non-random distribution and even segregation of two distinguishable phases may occur in the lattice. The IF-nanostructure of the present invention are characterized by the best doping effects achieved by adding substantially not more than 1% of the guest. Some specific but not limiting examples of the novel composition of the present invention are IF-Mo$_{1-x}$Nb$_x$S$_2$ and IF-Mo(W)$_{1-x}$Re$_x$S$_2$, where Nb and Re respectively are incorporated (doped or alloyed) into Mo- and Mo- or W-chalcogenide. FIGS. 1A to 1C show three tables exemplifying, respectively, various metal precursors suitable for the synthesis of the doped IF nanoparticles; IF-nanoparticles with possible p-type or n-type dopants; and IF-nanoparticles with possible magnetic dopants/impurities.

The structure of Mo-chalcogenide and Nb-chalcogenide (in particular $MoS_2$ and $NbS_2$) can be described as follows. In analogy with graphite, the unit cell of $MoS_2$ is made of two layers in hexagonal arrangement (2H). The Mo atom is covalently bonded to six sulfur atoms in trigonal biprism coordination. The interlayer spacing (c/2) is 6.15 Å. The interlayer spacing in the case of the IF-$MoS_2$ nanoparticles (6.2 Å) is slightly larger than the c/2 parameter of bulk 2H—$MoS_2$ polytype (6.15 Å) [1-3]. This expansion seen in the case of the IF-$MoS_2$ nanoparticles serves to alleviate the strain involved in the folding of the IF structure. In case of $NbS_2$, the various Nb—S phases were initially investigated revealing the existence of two polymorphs of the layered disulfide: the rhombohedral-3R (R3m) polytype with a unit cell consisting of three $NbS_2$ slabs which is formed when the elements are heated below 800° C. In this case the interlayer spacing was found to be 5.96 Å. The hexagonal-2H (P63/mmc) polymorph with a unit cell of two $NbS_2$ slabs is obtained above 850° C. The c/2 spacing is 5.981 Å in this case. In both polytypes the Nb is bonded to six neighboring sulfur atoms in octahedral coordination. Nonstoichiometric 3R—$Nb_{1+x}S_2$ compounds were also found. Further studies showed that the 3R polytype exists in the range 0<x<0.18, while the 2H polytype is stable only for small deviations from stoichiometry. Both phases exhibit metallic behavior, and the 2H-phase shows even superconductivity below 6.23K. It was noticed that the excess niobium atoms are actually intercalated in the vdW gap between each two $NbS_2$ layers. In the case of the IF-$NbS_2$ nanoparticles, which were synthesized by gas phase reaction, the interlayer spacing was found to be in the range 5.9-6.35 Å for the small (20-40 nm) particles and 6.2 Å for the larger (60-80 nm) ones. Annealing the as-obtained IF-$NbS_2$ nanoparticles resulted in a layer spacing varying from 6.15 to 5.9 Å and more faceted nanoparticles [7].

As for the layered transition-metal dichalcogenide $ReS_2$, it is a diamagnetic semiconductor that possesses an indirect gap in the near-infra-red (NIR) region of about 1.37 eV. The layered $ReS_2$ compound is of considerable interest for various applications (e.g. sulfur-tolerant hydrogenation and hydrodesulfurization catalyst, a solar-cell material in electrochemical cells) due to its optical, electrical and mechanical properties. The $ReS_2$ framework with a trigonal unit cell (crystallizes in s distorted C6 a structure) has the substructural motif consisting of $Re_4$ parallelogram units containing Re—Re metal bonds. IF-$ReS_2$ nanoparticles have been prepared by the direct sulfidization of $ReO_2$, formed from the decomposition of $ReO_3$ [14]. By adopting the MWCNT-templating approach, it has been also possible to prepare nanotubes of $ReS_2$ [15]. The crystal structure of $MoS_2$ (2H or 3R) is different than that of $ReS_2$ (C6). Therefore, it is not expected that the two different lattices would intermix and solid solutions of ReS2 and MoS2 would be miscible. Similar behavior was found in the case of growth of Re-doped $MoS_2$ single crystals wherein a 5% nominal doping or higher of Re in $MoS_2$ prevented the growth of single crystals [16]. In addition contrary to other layered $MS_2$ compounds ($MoS_2$ and $WS_2$), $ReS_2$ contains in its bulk form metal-metal bonded clusters ($Re_4$) and metal atoms that are octahedrally rather than trigonal prismatically coordinated with sulfur. Consequently, 0.5% and 1% rhenium-doped (Re-doped) $Mo(W)S_2$ single crystals have been grown by the chemical vapor transport method with $Br_2$ as a transport agent. The Re doping was found to induce n-type conductivity of the $Mo(W)S_2$ crystal [17].

Figure 2B:
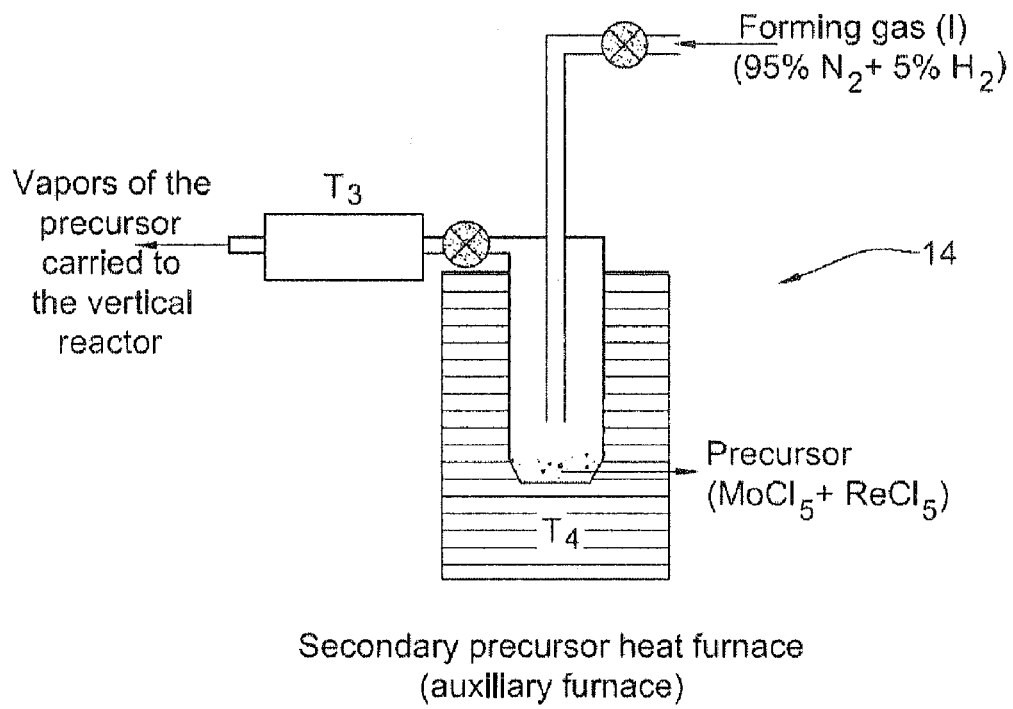

Reference is made to FIGS. 2A-2B exemplifying an apparatus, generally designated 10, suitable to be used for the manufacture of such IF nanostructures. The apparatus 10 includes a vertical reaction chamber 12 associated with a separate therefrom and connectable thereto evaporation chamber 14. The reaction chamber 12 has first and second inlet units 16A and 16B arranged so as to enable to flow therethrough reacting materials towards one another in opposite directions. The inlet unit 16A serves for supplying a flow of vapors of two precursor compositions A-$Y_1$ and B-$Y_2$, where each of A and B is a metal or transition metal and $Y_1/Y_2$ is/are halogen(s) independently selected from chlorine, bromine or iodine, together with a reducing agent carrying forming gas. The inlet unit 16B located at the opposite edge of the vertical reactor serves for supplying a flow of a chalcogenide carrying reacting gas.

As indicated above, metal or transition metal A may be one of the following: Mo, W, Re, Ti, Zr, Hf, Nb, Ta, Pt, Ru, Rh, In, Ga, InS, InSe, GaS, GaSe, WMo, TiW, and metal or transition metal B may be one of the following: Si, Nb, Ta, W, Mo, Sc, Y, La, Hf, Ir, Mn, Ru, Re, Os, V, Au, Rh, Pd, Cr, Co, Fe, Ni, where A and B are different and where B is to be doped to A-Y to obtain $A_{1-x}$-chalcogenide (i.e. x≦0.3). In the case of In(Ga)S(Se) the dopant/alloying atoms can be $In_{0.99}Ni_{0.01}S$ or $Ga_{0.98}Mn_{0.02}Se$.

In the present specific but not limiting example, the precursor compositions are $MoCl_5$ and $NbCl_5$; and the chalcogenide carrying reacting gas is $H_2S$. The reducing agent carrying forming gas is $H_2$.

The reaction chamber 12 further includes a gas outlet 18, and a filter 20. The reaction chamber is associated with a heating unit 22 configured to form a two-stage furnace for the synthesis of e.g. IF-$Mo_{1-x}Nb_xS_2$ nanoparticles: at the upper and lower parts of the chamber 12 different first and second temperature conditions $T_1$ and $T_2$ are provided.

Thus, vapors of $MoCl_5$ and $NbCl_5$ undergo a reduction reaction while interacting with $H_2$ gas during their flow towards a reaction zone where they meet $H_2S$ reacting gas. The reduction reaction is thus followed by a reaction with $H_2S$ resulting in the formation of IF-$Mo_{1-c}Nb_xS_2$ nanoparticles.

The vapors of $MoCl_5$ and $NbCl_5$ are produced in the separate (auxiliary) evaporation chamber 14. It should be noted that generally separate chambers could be used for evaporating therein the two precursors, respectively, $MoCl_5$ and $NbCl_5$ in the present example. It should also be noted that $H_2$ gas can be supplied into the evaporation chamber thereby causing a reduction reaction to start while the precursor compositions are being evaporated in the evaporation chamber.

Thus, in the above-described example, mixed phase IF-$Mo_{1-x}Nb_xS_2$ nanoparticles are prepared (synthesized) by a vapor-based method (vapor-phase reaction) starting from the respective volatile metal chloride precursors in combination with $H_2S$. The IF-$Mo_{1-x}Nb_xS_2$ nanoparticles, containing up to 25% Nb, were characterized by a variety of experimental techniques. Analysis of the X-ray powder diffraction; X-ray photoelectron spectroscopy, and different electron microscopy techniques, show that the majority of the Nb atoms are organized as nanosheets of $NbS_2$ within the $MoS_2$ host lattice. Most of the remaining Nb atoms (3%) are interspersed individually and randomly in the $MoS_2$ host lattice. Very few Nb atoms, if any, are intercalated between the $MoS_2$ layers. A sub-nm film of niobium oxide seems to encoat the majority of the nanoparticles. This unfavorable coating could be eliminated by reducing the rate of the $NbCl_5$ evaporation. X-ray photoelectron spectroscopy in the chemically resolved electrical measurement mode (CREM) and scanning probe microscopy measurements of individual nanoparticles show that the mixed IF nanoparticles are metallic independent of the substitution pattern of the Nb atoms in the lattice of $MoS_2$ (whereas unsubstituted IF-$MoS_2$ nanoparticles are semiconducting). In other words, the so obtained IF nanostructures have electrical conductivity appreciably higher than that of a semiconductor A in the A-chalcogenide precursor.

Generally, the invented technique can be used for obtaining one of the following type IF nanostructures: $Mo_{1-x}Nb_xS_2$, $Mo_{1-x}Nb_xSe_2$, $W_{1-x}Ta_xS_2$, $W_{1-x}Ta_xSe_2$, $Mo_xW_yNb_{1-x-y}S_2$, $Mo_xW_yNb_{1-x-y}Se_2$, $Re_{1-x}W_xS_2$, $Ti_{1-x}Sc_xS_2$, $Zr_{1-x}Y_xS_2$, $Hf_{1-x}La_xS_2$, $Ta_{1-x}Hf_xSe_2$, $Pt_{1-x}Ir_xS_2$, $Ru_{1-x}Mn_xS_2$, $Rh_{1-x}Ru_xS_2$, $Mo_{1-x}Re_xS_2$, $W_{1-x}Re_xS_2$, $Re_{1-x}Os_xS_2$, $Ti_{1-x}V_xS_2$, $Zr_{1-x}Nb_xS_2$, $Hf_{1-x}Ta_xS_2$, $Ta_{1-x}W_xS_2$, $Pt_{1-x}Au_xS_2$, $Ru_{1-x}Rh_xS_2$, $Rh_{1-x}Pd_xS_2$. Those structures can lead to enhanced electrical conductivity of the otherwise semiconducting A-chalcogenide IF nanostructures.

Another option in accordance with the present invention is obtaining nanostructures having magnetic dopants such as Fe (See FIG. 14C for other possible examples) leading to the formation of: $FeMoS_2$, $FeMoSe_2$, $FeWS_2$, $FeWSe_2$, $FeReS_2$, $FeHfS_2$, $FeWMoS2$, $FeTiS_2$, $FeZrS_2$, $FeS_2$, $FeTaS_2$, $FeNbS_2$, $FeTaS_2$, $FeNbSe_2$, $FeTaSe_2$.

The following are some example of the preparation of IF-nanostructures of present invention. Generally, characterization of all synthesized nanoparticles of the present invention was done in the following manner:

A vertical theta-theta diffractometer (TTRAX III, Rigaku, Japan) equipped with a rotating Cu anode operating at 50 kV and 200 mA was used for x-ray powder diffraction (XRD) studies. The measurements were carried out in the reflection Bragg-Brentano mode within the range of 10-70° of 2Θ-angles. XRD patterns were collected by a scintillation detector. The minute quantities of material available dictated a very slow data rate (0.05°/min). The peak positions and shapes of the Bragg reflections were determined by a self-consistent profile-fitting procedure using the Jade 8 software. XRD was carried out on both the IF-$Mo(W)_{1-x}Re_xS_2$ (from this work) and IF-$MoS_2$/IF-$WS_2$ nanoparticles (used as a reference) [7a,b].

The following electron microscopes were used in this work: transmission electron microscope (Philips CM120 TEM) operating at 120 kV, equipped with EDS detector (EDAX-Phoenix Microanalyzer); HRTEM with field emission gun (FEI Technai F30-UT) operating at 300 kV, equipped with a parallel electron energy loss spectrometer [Gatan imaging filter-GIF (Gatan)]. For electron microscopy and analysis the collected powder was sonicated in ethanol and placed on a carbon-coated Cu grid (for TEM) or on lacy carbon-coated Cu grids (for HRTEM and EELS).

X-ray photoelectron spectroscopy (XPS) was carried out using a Kratos AXIS-HS spectrometer at a low power (75 W) of the monochromatized A1 (Kα) source. The samples for XPS analyses were prepared by depositing a few drops of the nanoparticles sonicated in ethanol, onto an atomically flat Au substrate (SPI supplies, thickness-150 nm) or onto Au polycrystalline films coating Si substrates.

Example 1

Preparation of IF $Mo_{1-x}Nb_xS_2$ nanoparticles

The synthesis of the IF-$Mo_{1-x}Nb_xS_2$ nanoparticles was carried out starting from the precursors $MoCl_5$ (Aldrich) and $NbCl_5$ (Alfa Aesar) in reaction with $H_2S$ using the vertical reactor shown in FIG. 2A. Before each growth session, the vertical reactor being the reaction chamber 12 was preset to higher temperatures of about 600° C. and was purged continuously with $N_2$ in order to prevent traces of $O_2$ and water vapor that would otherwise interfere with the course of the reaction.

Precursors $MoCl_5$ (0.550 g; m.pt=194° C., b.pt=268° C.) and $NbCl_5$ (0.010 g m.pt=204.7° C., b.pt=254° C.) were first heated in the auxiliary furnace (evaporation chamber) 14 to a temperature of ~250° C. ($T_4$). In order to avoid condensation of the vapors of the precursor, before it reaches the vertical reactor 12, a preset temperature of 220° C. ($T_3$) was maintained along the length of a tube (not shown) connecting the chambers 14 and 12 using a heating band. The vapors of the precursor were carried from below (i.e. through inlet 16A at the bottom edge of the reactor 12) into the hot to zone (kept at a preset temperature, e.g. 900° C.) by flowing 50 cc of forming gas (I) (95% $N_2$ and 5% $H_2$). Forming gas was used to ensure complete reduction of the metal chloride precursors. Simultaneously, 5 cc $H_2S$ (II) was introduced from above (i.e. through inlet 16B at the top edge of the reactor 12) mixed along with 50 cc of $N_2$ (III). The typical time period for each reaction was 30 min.

Two series of reactions (see Table 1 below) were carried out, wherein the temperature inside the reaction chamber 12 was maintained at (i) $T_1$=800° C. and $T_2$=850° C. (series-1) and (ii) $T_1$=850° C. and $T_2$=900° C. (series-2). At the end of the reaction, the product was collected (as a black colored powder) at the hot zone of the reactor 12 by means of the quartz wool filter 20, and was subsequently analyzed by various characterization techniques as detailed in Table 1 below.

TABLE 1

| Temp of vertical Reactor 12 | Temp. of Chamber 14 | Gas flow Rate | Size of obtained IF-$Mo_{1-x}Nb_xS_2$ nanoparticles | Physical description of obtained IF-nanoparticles |
|---|---|---|---|---|
| Series -1<br>$T_1$ = 800° C.<br>$T_2$ = 850° C. | $T_3$ = 220° C.<br>$T_4$ = 250° C. | Forming gas<br>(I) = 50 cc;<br>(95% $N_2$; 5% $H_2$)<br>$H_2S$ (II) = 5 cc<br>$N_2$(III) = 50 cc | ~50 nm | Spherical IF nanoparticles |
| Series -2<br>$T_1$ = 850° C.<br>$T_2$ = 900° C. | $T_3$ = 220° C.<br>$T_4$ = 250° C. | Forming gas<br>(I) = 50 cc;<br>(95% $N_2$; 5% $H_2$)<br>$H_2S$ (II) = 5 cc<br>$N_2$(III) = 50 cc | ~40 nm | IF nanoparticles More faceted |

X-ray powder diffraction (XRD) studies were applied to the product using a vertical theta-theta diffractometer (TTRAX III, Rigaku, Japan) equipped with a rotating Cu anode operating at 50 kV and 240 mA. The measurements were carried out in the reflection Bragg-Brentano mode within the range of 10-70° of 2Θ-angles. XRD patterns were collected by a scintillation detector. The minute quantities of material available dictated a very slow data rate (0.05°/min). The peak positions and shapes of the Bragg reflections were determined by a self-consistent profile-fitting procedure using the Jade 8 software. XRD was carried out on both the IF-$Mo_{1-x}Nb_xS_2$ (from this work) and IF-$MoS_2$ nanoparticles (used as a reference).

Figure 3:
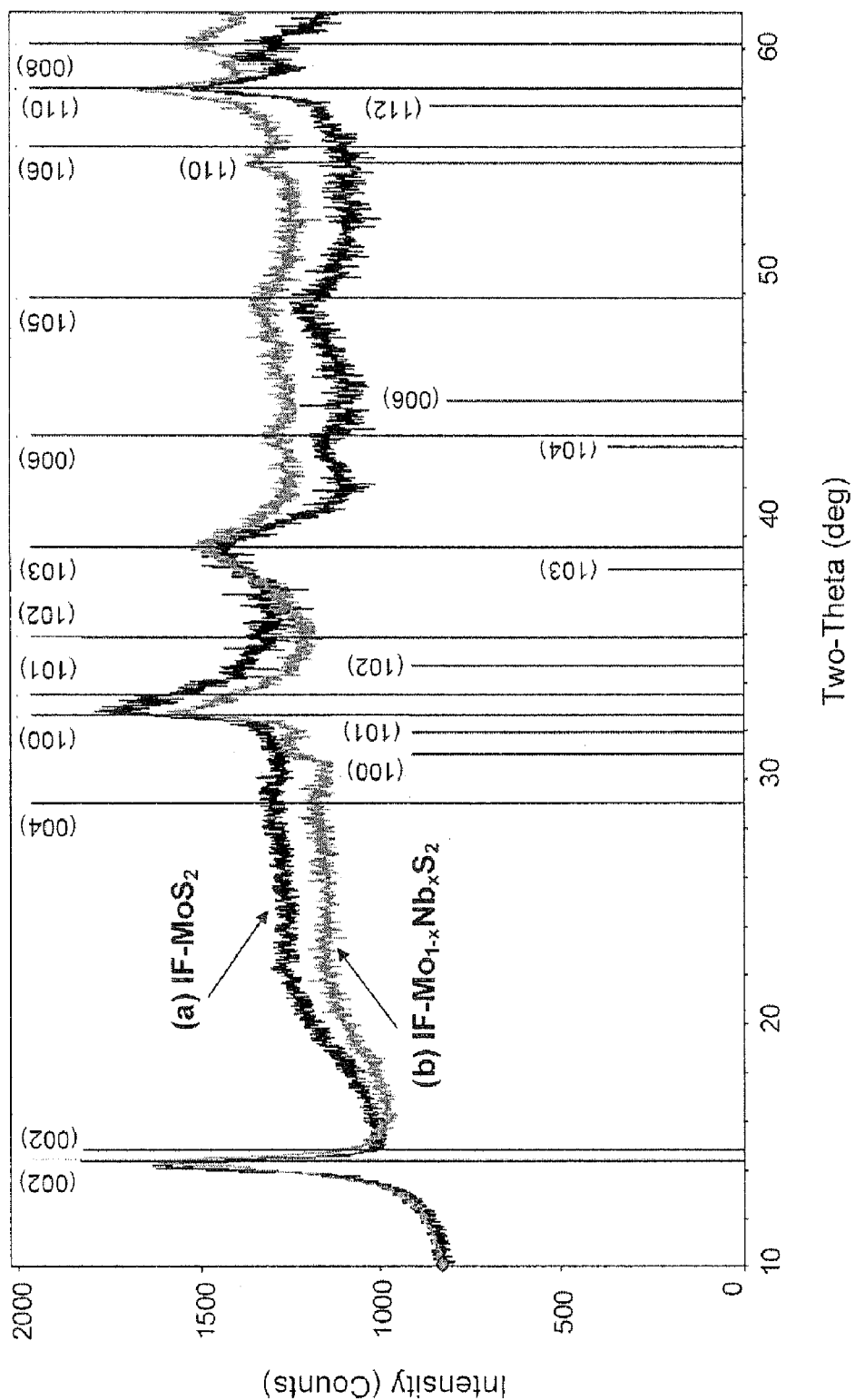
FIG. 3 shows XRD pattern of (a) IF-MoS$_2$ and (b) IF-Mo$_{1-x}$Nb$_x$S$_2$ nanoparticles prepared at $T_1$=850° C. and $T_2$=900° C. (series-2). Standard diffraction patterns of 2H—MoS$_2$ (long lines) and 2H—NbS$_2$ (short lines) are also shown for comparison.
Figure 4:
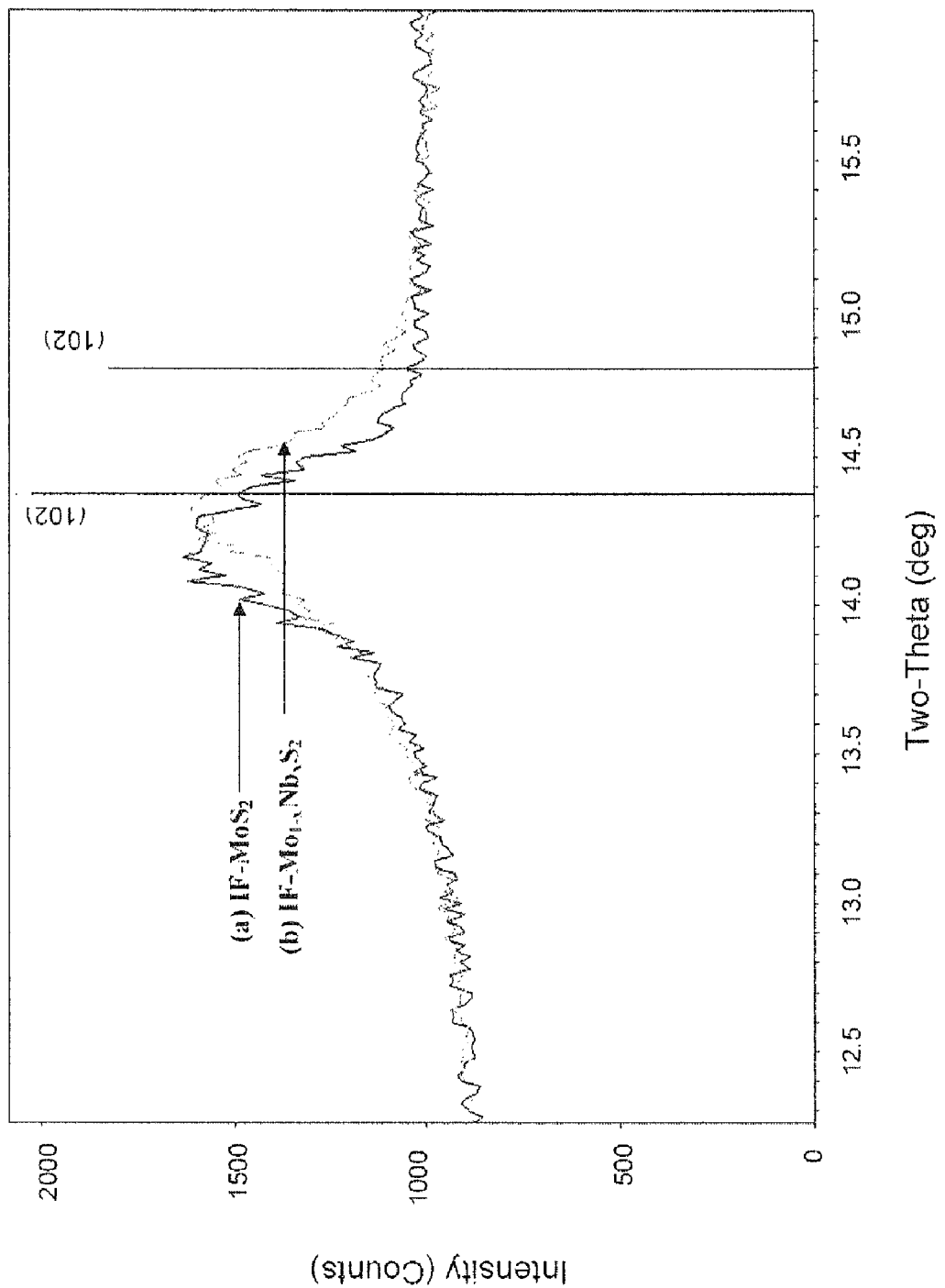
FIG. 4 shows a zoom-in look of (002) peaks from FIG. 2. Standard diffraction patterns of 2H—MoS$_2$ (long line) and 2H—NbS$_2$ (short line) are also shown for comparison.

FIG. 3 shows the XRD patterns obtained from for (a) IF-$MoS_2$ and (b) IF-$Mo_{1-x}Nb_xS_2$ nanoparticles (series-2) synthesized as described above prepared at $T_1$=850° C. and $T_2$=900° C. (series-2). FIG. 4 shows a zoom-in look of (002) peaks from FIG. 3. In both figures, standard diffraction patterns of 2H—$MoS_2$ (long line) and 2H—$NbS_2$ (short line) are shown for comparison.

A halo around 22° in FIG. 3 is due to the traces of amorphous quartz wool, which was used as a filter for collecting the synthesized nanoparticles. It is seen that the peaks of the first pattern (FIG. 3, curve a) matches IF-$MoS_2$ nanoparticles (used as a reference), while the second pattern corresponds to IF-$Mo_{1-x}Nb_xS_2$ nanoparticles (FIG. 3, curve b). The peaks in the IF-$Mo_{1-x}Nb_xS_2$ phase match well with that of IF-$MoS_2$. A detailed comparison between IF-$MoS_2$ and IF-$MoNbS_2$ (FIGS. 3 and 4) diffraction patterns shows some shifts of the (002) and (110) peaks. Comparing the (002) peaks at ~14° for both IF-$MoS_2$ and IF-$Mo_{1-x}Nb_xS_2$ (FIGS. 3 and 4) it can be concluded that one of them (IF-$MoS_2$, FIG. 3, curve a and FIG. 4, curve a) has a symmetric shape while the other (IF-$Mo_{1-x}Nb_xS_2$ FIG. 3, curve b and FIG. 4, curve b) does not. The peak profile (~14°, FIG. 4, curve b) is certainly not symmetric and probably consists of two peaks corresponding to c-axis spacings of 6.4 Å and 6.165 Å. The (110) peak at ~58° of IF-$Mo_{1-x}Nb_xS_2$ (FIG. 3) has a very small shift (about 0.08°) to lower angles with respect to the IF-$MoS_2$ (110) peak. There are additional peaks at 2.88 Å (31° and 1.66 Å (55.3° which are best suited to the (100) and (110) reflections of the 2H—$NbS_2$ phase. Moreover, the peak profile around 31° exhibits an asymmetry (fast intensity increase and slow decrease with increasing angle) which is similar to the shape of the (100) reflection of IF-$MoS_2$ at 32.7° (FIG. 3, curve a). This latter peak is a typical example for the strongly asymmetric line shapes of the (h00) peaks of layered materials with relatively small number of stacked molecular layers [12]. The absence of any other $NbS_2$ peak could be attributed to their relatively small concentration and their poor lattice order, which leads to low intensity of the $NbS_2$-related peaks in the noisy spectrum. All the other mixed (hk1) peaks would be expected to be suppressed completely if it is assumed that the $NbS_2$ structures form a turbostratically (misaligned layers) stacked system with randomness in translation and rotation of the layers. This may also be the reason for the broadening of the (002) peak (~14°) in the case of the IF-$Mo_{1-x}Nb_xS_2$ nanoparticles.

The X-ray diffraction data presented above indicates that the as-synthesized IF-$Mo_{1-x}Nb_xS_2$ nanoparticles are comprised of two phases corresponding to those of (Nb doped) $MoS_2$ and $NbS_2$. The presence of a distinct phase with Nb as an intercalant is supported neither by the XRD nor by the electron diffraction. If existed, such a phase would be revealed by typical (001) peaks at lower angles (larger interlayer spacing) [5]. The presence of a broad (002) peak (and the shift of this peak toward the position of (002) reflection of $NbS_2$) is indicative of the existence of fragments of a $NbS_2$ lattice incorporated turbostratically among the $MoS_2$ layers. Furthermore the presence of only (hk0) peaks of $NbS_2$ is indicative of the presence of the respective single layers. However, according to the Vegard's law, a small shift in the positions of the (110) peak in the case of IF-$Mo_{1-x}Nb_xS_2$ nanoparticles towards the position of (110) reflection of $NbS_2$ indicates substitution of a minor part (about 3%) of individual Mo atoms by individual Nb atoms into the $MoS_2$ structure (in addition to the $NbS_2$ nanosheets interspersed in the $MoS_2$ structure). It should be noted that the corresponding change of the lattice parameter is so small that an expected shift of another in-plane (100) peak at 32.7° will be comparable with the error of the measurement and consequently cannot be observed. Thus, in addition to the sheets/stripes of $NbS_2$ present turbostratically among the $MoS_2$ layers, there is also the replacement of Mo atoms individually by Nb atoms in the case of IF-$Mo_{1-x}Nb_xS_2$ nanoparticles.

Extensive TEM investigations were carried out on the IF-$Mo_{1-x}Nb_xS_2$ nanoparticles. The following electron microscopes were used: transmission electron microscope (Philips CM120 TEM) operating at 120 kV, equipped with EDS detector (EDAX-Phoenix Microanalyzer); HRTEM with field emission gun (FEI Technai F30-UT) operating at 300 kV, equipped with a parallel electron energy loss spectrometer [Gatan imaging filter-GIF (Gatan)].

For electron microscopy and analysis the collected powder was sonicated in ethanol and placed on a carbon-coated Cu grid (for TEM) or on lacy carbon-coated Cu grids (for HRTEM and EELS). The energy windows for the elemental mapping by energy-filtered TEM (EFTEM) were chosen as follows (standard parameters of the software): Sulfur map was measured around the S $L_{2,3}$ edge (167-187 eV); Niobium map was measured around the Nb $L_3$ edge (2370-2470 eV); Oxygen map was measured around the O K edge (532-562 eV).

Figure 5A:
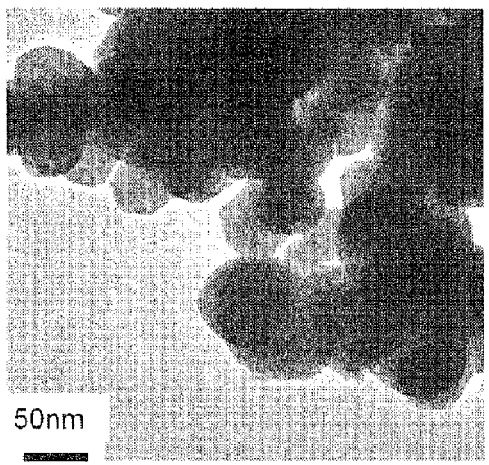
FIGS. 5A-5D show (FIG. 5A) TEM image of the IF-Mo$_{1-x}$Nb$_x$S$_2$ nanoparticles prepared at $T_1$=800° C. and $T_2$=850° C. (series-1), (FIG. 5B) and (FIG. 5C) HRTEM images of the IF-Mo$_{1-x}$Nb$_x$S$_2$ nanoparticles prepared at $T_1$=850° C. and $T_2$=900° C. (series-2).
Figure 5B:
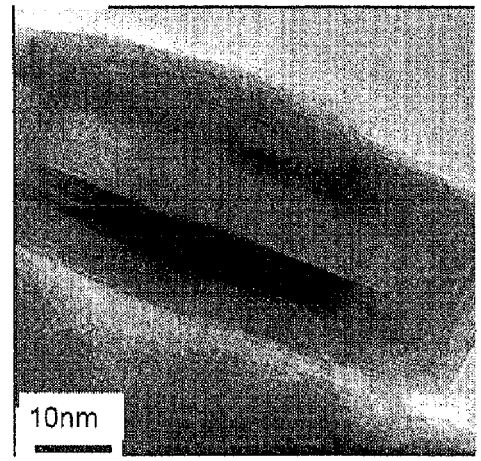
Figure 5C:
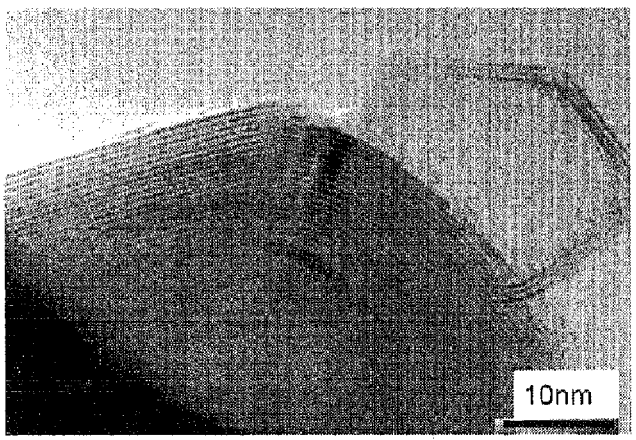
Figure 5D:
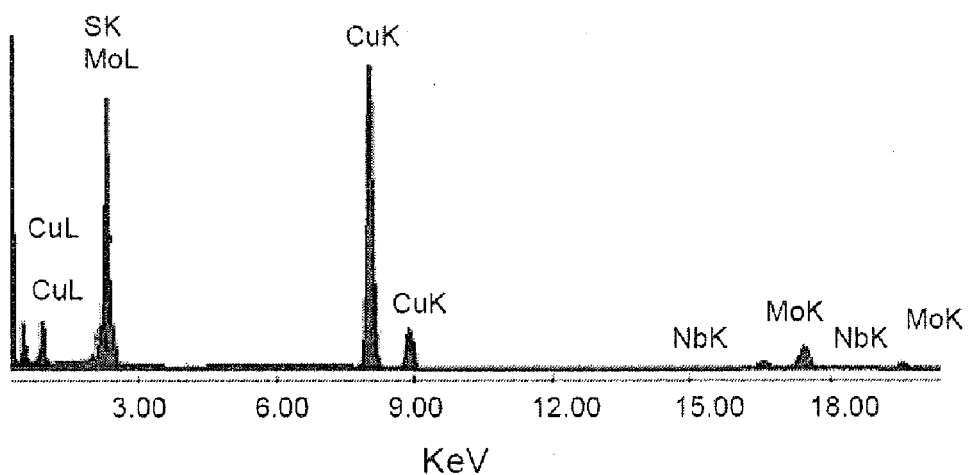

Reference is made to FIGS. 5A to 5D showing the TEM and HRTEM images of the IF-$Mo_{1-x}Nb_xS_2$ nanoparticles: FIG. 5A shows a collection of IF-$Mo_{1-x}Nb_xS_2$ nanoparticles synthesized at $T_1$=800° C. and $T_2$=850° C. (series-1). As can be seen from the TEM image, the as-obtained IF nanoparticles are of uniform size distribution (diameter ~50 nm). FIGS. 5B and 5C present the HRTEM images of the IF-$Mo_{1-x}Nb_xS_2$ nanoparticles prepared at $T_1$=850° C. and $T_2$=900° C. (series-2), respectively. The diameter of the IF-$Mo_{1-x}Nb_xS_2$ nanoparticles obtained by this reaction is about ~40 nm. However, occasionally some very large IF nanoparticles of about 200 nm in diameter can be also observed. FIG. 5D shows the EDS spectra of the IF-$Mo_{1-x}Nb_xS_2$ nanoparticle of FIG. 4C.

Niobium atoms are uniformly distributed in all the examined nanoparticles, irrespective of their size or shape. The presence of the characteristic and distinct Mo (K,L), S (K) and Nb (K,L) lines can be seen clearly. Comparing the IF nanoparticles of series-1 and series-2 cases, the series-2 IF nanoparticles are much more faceted and well crystallized. This is due to the higher synthesis temperature used in this case. The development of an IF structure displaying improved crystallinity and increased faceting with rising temperature was studied previously in the case of IF—$NbS_2$ and IF-$TaS_2$ [7,8]. The IF nanoparticle seen in FIG. 5B is reminiscent of a nanotube (nanotubes of undoped $MoS_2$ were obtained previously in the same temperature regime) [4a]. The growth of the nanoparticles is very fast (<1 s). The supply of the precursor gasses is unlimited and the nanoparticles remain in the hot zone of the reactor until the reaction is turned down (30 min). These observations are indicative of that the nanoparticles cease to grow due to energetic consideration. Similar considerations were found to control the size of $WS_2$ ($MoS_2$) nanotubes [10].

Figure 6A:
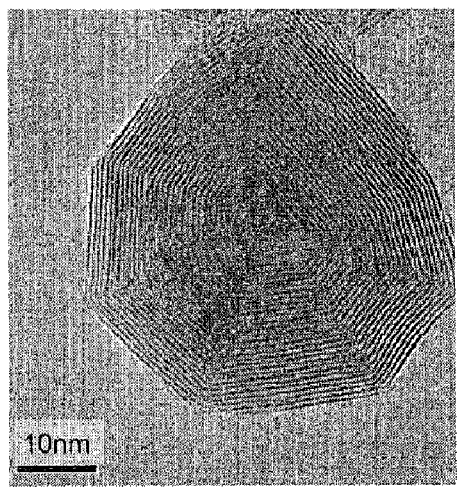
FIGS. 6A-D show (FIG. 6A) HRTEM image and (FIG. 6B) the corresponding EELS spectrum of the IF-Mo$_{1-x}$Nb$_x$S$_2$ nanoparticles prepared at $T_1$=850° C. and $T_2$=900° C. (series-2), (FIG. 6C) Exploded view of a portion of nanoparticle in (FIG. 6A) showing mismatch in the layers, (FIG. 6D) HRTEM of another IF nanoparticle showing defects/dislocations in the layers.
Figure 6B:
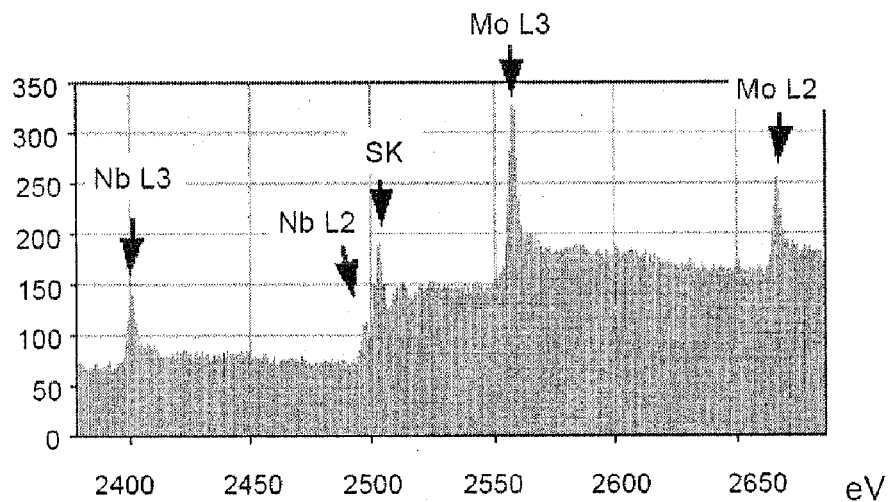
Figure 6C:
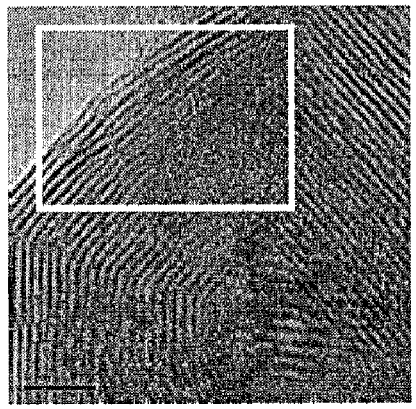
Figure 6D:
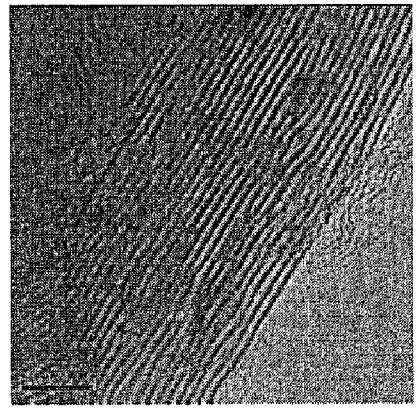

Referring to FIGS. 6A to 6C, there are shown the HRTEM images (FIG. 6A) and the corresponding EELS spectra (FIG. 6B) of an individual IF-$Mo_1$–$Nb_xS_2$ nanoparticle prepared at $T_1=850°$ C. and $T_2=900°$ C. (series-2), and an exploded view (FIG. 6C) of a portion of the nanoparticle of FIG. 6A. As shown in FIG. 6A, the particle is well faceted with clear and sharp curvatures forming the closed-cage nanoparticle (diameter is ~40 nm, number of layers ~30). The EELS spectrum of FIG. 6B shows a good signal-to-noise ratio and very distinct Mo ($L_{3,2}$), S (K) and Nb ($L_{3,2}$) peaks. The Mo/Nb ratio was determined by the integration of the Nb-$L_{3,2}$ edge relative to the Mo-$L_{3,2}$ edge, after background subtraction. This gives an atomic ratio of Nb to Mo of about 0.30/1.00. The relative concentration of Nb in the Mo-compound in the product, as derived from EELS and from TEM-EDS analysis data, ranges between 15-25%. In order to ascertain whether Nb is present as an intercalant, between the $MoS_2$ walls, or in substitutional sites in the layers of the $MoS_2$ lattice, additional TEM-EDS and HRTEM-EELS analyses were performed. The results show that the Mo+Nb+S ratio remained nearly constant, independent of the IF nanoparticle diameter and position. The low loss region in the EELS spectra show two characteristic peaks: a plasmon peak at 23.3±0.1 eV, which is shifted to lower energies by 0.2 eV relative to the pure IF-$MoS_2$ sample (23.5±0.1 eV), and an additional feature at 8.2±0.2 eV. However, this change is too small to be used to differentiate between the two modes of Nb insertion, either in the layers of the host lattice ($MoS_2$) or as intercalating moiety in-between the $MoS_2$ layers. As shown in FIG. 6C, which is an enlarged view of a portion of the nanoparticle of FIG. 6A, a mismatch in the layers exists. FIG. 6D, which is the HRTEM of another IF nanoparticle, shows defects/dislocations in the layers.

The presence of layers' mismatch, defects and/or dislocations, in the case of the IF-$Mo_{1-x}Nb_xS_2$ nanoparticles, is another indication for the incorporation of Nb atoms in the lattice of $MoS_2$. The occurrence of such defects is not surprising considering the difference in coordination of the two metal atoms (trigonal biprism for the Mo and octahedral for the Nb atom). These kinds of defects were very rare in the case of the pure IF-$MoS_2$ nanoparticles [4a].

Figure 7A:
FIGS. 7A-7C show (FIG. 7A) HRTEM image and (FIG. 7B) the expanded view of a portion of the IF-Mo$_{1-x}$Nb$_x$S$_2$ nanoparticles prepared at $T_1$=850° C. and $T_2$=900° C. (series-2), (FIG. 7C) Line profile of the boxed are in (FIG. 7B) shows the interlayer spacing to be 6.4 Å.
Figure 7B:
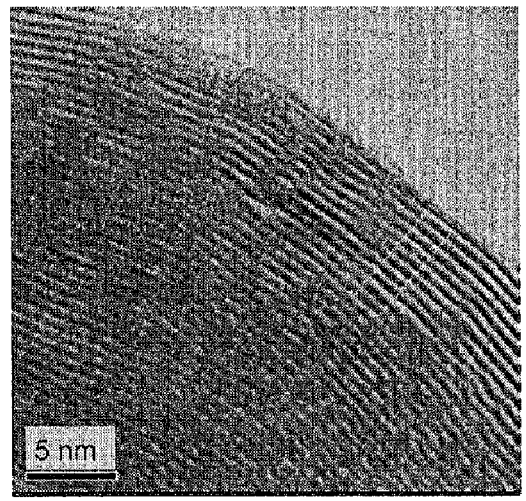
Figure 7C:
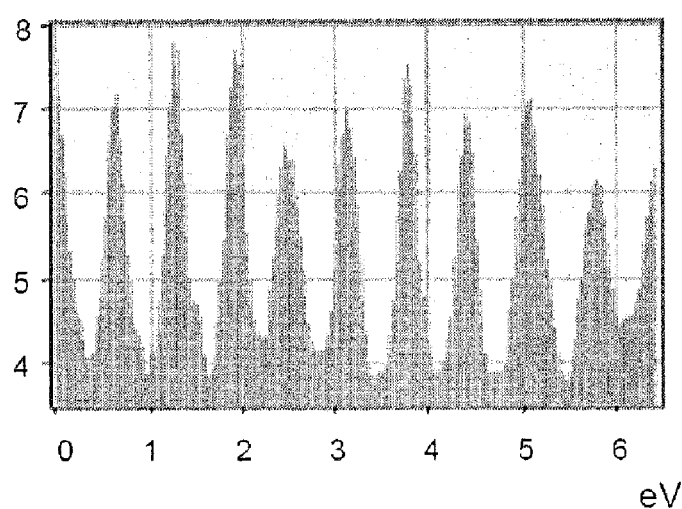

Reference is made to FIGS. 7A to 7C, where FIG. 7A shows the HRTEM image of the IF-$Mo_{1-x}Nb_xS_2$ nanoparticles prepared at $T_1=850°$ C. and $T_2=900°$ C. (series-2); FIG. 7B shows an expanded view of a portion of the particle of FIG. 7A; and FIG. 7C is a line profile of a framed region in FIG. 7B.

As revealed by the line profile of the framed area in FIG. 7B, the interlayer spacing is 6.40 Å. Although this spacing is observed in some cases (as described with respect to XRD study), this does not seem to be the rule for all the IF-$Mo_{1-x}Nb_xS_2$ nanoparticles, since some of them exhibit the 6.20 Å spacing which is typical for the pure IF-$MoS_2$ nanoparticles. The observed expansion in the case of IF-$Mo_{1-x}Nb_xS_2$ nanoparticles might be too small to be attributed to intercalation of Nb in-between the layers. Previously, alkali metal intercalation of IF-$MoS_2$ and IF-$WS_2$ nanoparticles, resulted in a lattice expansion of 2-3 Å [5]. Furthermore, electron diffraction (ED) analysis of individual IF-$Mo_{1-x}Nb_xS_2$ nanoparticles does not support such intercalation. The diffraction pattern did not reveal any additional spots that may arise due to Nb intercalation.

The above results are also in good agreement with the XRD diffraction data. As mentioned above, $NbS_2$ may appear in two polytypes, hexagonal-2H (P63/mmc) and rhombohedral-3R (R3m). The XRD data of FIGS. 3 and 4 agree well with that of the 2H polytype. Thus, in this case, defects and dislocations in the layers, arising due to the incorporation of Nb in the layers, might be responsible for the observed increase in the layer spacing. Also, the fact that intercalation of IF nanoparticles with e.g. alkali metal atoms was found to be very non-uniform with internal layers of the IF nanoparticles unaffected at all, should be taken into account. The fact that Nb is distributed uniformly in the present IF-$Mo_{1-x}Nb_xS_2$ nanoparticles indicates that there is much less strain here as compared to the case of alkali metal intercalation in IF nanoparticles. Lattice substitution of Nb into the $MoS_2$ network is much less energetically demanding than intercalation, which leads to a large expansion in the interlayer distance.

Figure 8A:
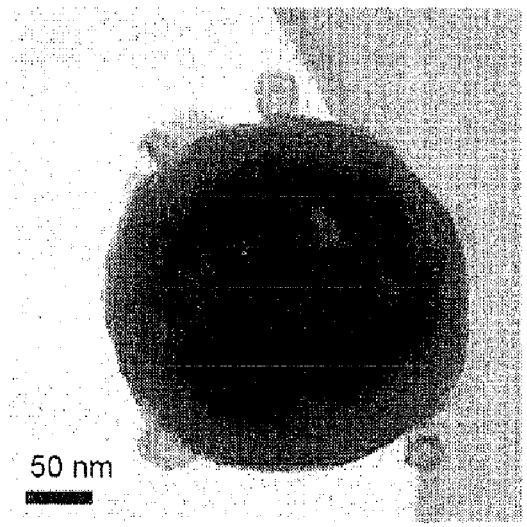
FIGS. 8A-8D disclose images of elemental mapping by energy-filtered TEM (EFTEM) of IF-Mo$_{1-x}$Nb$_x$S$_2$ nanoparticle, with a thin surface oxide layer.
Figure 8B:
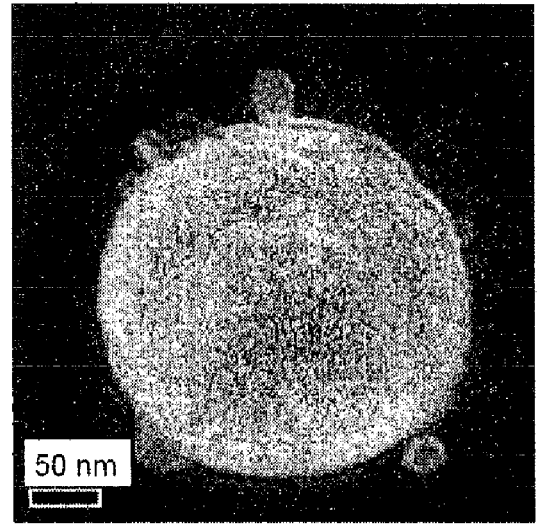
Figure 8C:
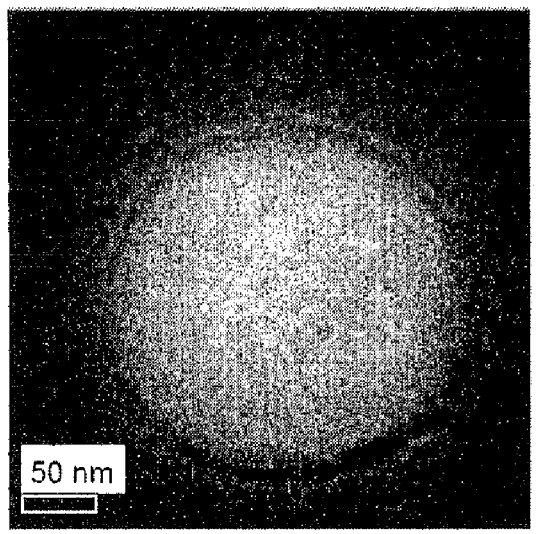
Figure 8D:
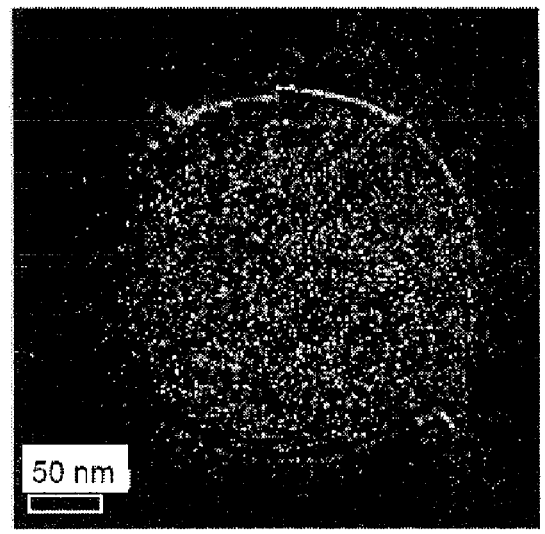

Elemental mapping by energy-filtered TEM (EFTEM) analysis revealed the presence of Nb uniformly throughout the particles. Apart from the uniform Nb substitution into the $MoS_2$ lattice, there is also a very thin amorphous niobium oxide layer seen as an outer envelope on the IF nanoparticles [7]. In this connection, reference is made to FIGS. 8A to 8D, showing images of elemental mapping by energy-filtered TEM (EFTEM) of IF-$Mo_{1-x}Nb_xS_2$ nanoparticle, with a surface oxide layer, FIG. 8A shows a zero-loss image; FIG. 8B shows the sulfur map measured around the S $L_{2,3}$ edge (167-187 eV); FIG. 8C shows the niobium map measured around the Nb $L_3$ edge (2370-2470 eV); and FIG. 5D shows oxygen map measured around the O K edge (532-562 eV), which is indicative of a very thin $NbO_x$ film covering the IF nanoparticle surface.

The stoichiometry of niobium oxide and the oxidation of niobium metal are of considerable interest, especially in the realm of superconductivity. Niobium oxide is known to exist in three principal forms: $Nb_2O_5$, $NbO_2$, and NbO, but several suboxides of the form $NbO_x$ (x<1) are also known, and the structure of many of these have been reported. In the present case, however, since the top oxide film is amorphous, it was not possible to ascertain the exact phase of the niobium oxide layer sheathing the IF-$Mo_{1-x}Nb_xS2$ nanoparticles. A summary of all the data is presented in Table 2 below, comparing the 2H—$MoS_2$ (2H—$NbS_2$), IF-$MoS_2$ (IF-$NbS_2$) and the IF-$Mo_{1-x}Nb_xS_2$ nanoparticles.

TABLE 2

|  | Polytypes | Size | Additional information | |
|---|---|---|---|---|
|  |  |  | Composition | Type |
| $MoS_2$ | hexagonal-2H (P63/mmc) c/2 = 6.15 A rhombohedral - 3R = 6.06 A | — | — | — |
| $NbS_2$ | hexagonal-2H (P63/mmc) c/2 = 5.981 A rhombohedral - 3R(R3m) = 5.96 A | — | — | — |

TABLE 2-continued

| | Polytypes | Size | Composition | Type |
|---|---|---|---|---|
| IF-MoS$_2$[8n] | hexagonal-2H (P63/mmc) c/2 = 6.20 Å | ~50 nm | Mo:S 1:2 | Spherical/Faceted nanoparticles |
| IF-NbS$_2$[12d] | rhombohedral - 3R(R3m) c/2 = 6.15 to 5.9 Å depending on annealing | 20-40 nm (small particles) 60-80 nm (large particles) | Nb:S 1:2 | Spherical nanoparticles |
| IF-Mo$_{1-x}$Nb$_x$S$_2$ | Hexagonal-2H (P63/mmc) c/2-6.40 Å | ~40-50 nm (90% small particles) ~200 nm (large particles 10%) | 15-25% Nb NbO$_%$ surface layer | Spherical/Faceted nanoparticles |

Thus, the TEM analysis reveals the presence of well faceted nanoparticles of diameter 40-50 nm, EDS and EELS measurements show the presence of Mo, Nb, S on the same individual nanoparticles, with Nb uniformly distributed over the entire nanoparticle. The concentration of Nb in each of the individual nanoparticles present is ascertained to be around ~15-25% by TEM-EDS and HRTEM-EELS analysis. In some IF nanoparticles the interlayer spacing increases to 6.4 Å due to defects and/or dislocations within the layer arising as a result of Nb incorporation while in others the interlayer spacing remains at 6.2 Å (note that Nb is present uniformly in these IF nanoparticles as well). HRTEM-EELS chemical mapping reveals the presence of Nb distributed uniformly throughout the nanoparticles. The fact that the Nb is distributed randomly in the individual IF-Mo$_{1-x}$Nb$_x$S$_2$ nanoparticle and the absence of any local variations in the chemical composition excludes Nb intercalation as a potential major mechanism for altering the IF-MoS$_2$ lattice. Thus, Nb is incorporated within the MoS$_2$ layers. In addition from the EFTEM observations the presence of an oxide layer covering the nanoparticles is observed.

Reference is now made to Table 3 below and FIGS. 9 and 10A-10C, presenting the X-ray Photoelectron Spectroscopy (XPS) results. Table 3 summarizes the XPS data of the IF-Mo$_{1-x}$Nb$_x$S$_2$ nanoparticles (series-2) given as atomic concentration of the different elements.

TABLE 3

| Element | Atomic Concentration (%) |
|---|---|
| Nb$^{red}$ | 0.37 |
| Nb$^{ox}$ | 1.15 |
| Mo | 3.31 |
| S | 7.77 |
| S$^{ox}$ | 0.78 |
| O | 3.15 |
| C | 30.6 |
| Au | 24.81 |

Figure 9:
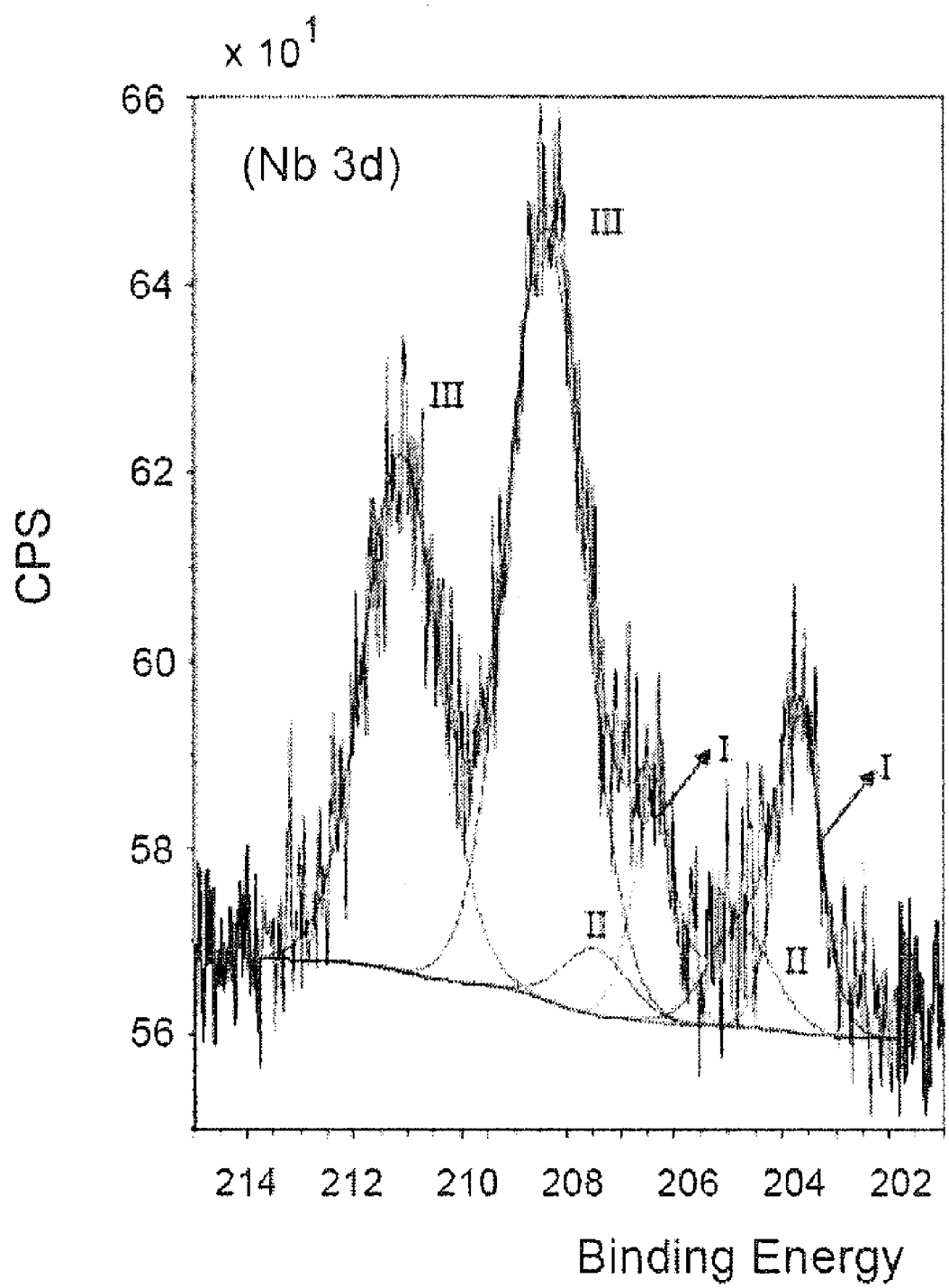
FIG. 9 exhibits XPS line shape analysis of the Nb 3d signal (with Gaussian-Lorenzian components). Reduced Nb (I and II) is believed to be within the nanoparticles. The oxidized Nb (III) appears on the particle surfaces.

FIG. 9 illustrates the corresponding Nb 3d spectrum (i.e. line shape analysis of the Nb 3d signal with Gaussian-Lorenzian components: Here, reduced Nb (I and II) is believed to be within the nanoparticles. The oxidized Nb (III) appears on particle surfaces. More specifically: three doublets are shown in the figure; the two low-energy doublets correspond to a reduced Nb moiety, presumably within the dichalcogenide layers, while the high-energy doublet is associated with oxidized (external) Nb (as also revealed by energy filtered TEM). It should be noted that the last entry in Table 3, Au in an atomic concentration of 24.81, relates to Au from the substrate that is not part of the formed IF-Mo$_{1-x}$Nb$_x$S$_2$ nanoparticles. The high surface sensitivity of the XPS technique explains the large concentration of carbon which emanates from surface impurities.

The binding energies of Mo and S exhibit a marked difference when the Nb-substituted and the unsubstituted samples are compared: Mo(3d$_{5/2}$) at 228.9 and 229.3, respectively, and S(2p$_{3/2}$) at 161.7 and 162.1, respectively. This is clear evidence for incorporation of Nb into the Mo-based particles. The observed difference, which is practically identical for the Mo and S lines, 400±100 meV, is far beyond any possible charging effect (as will be described below with respect to CREM data). Also, it does not show up at the gold and carbon signals (and has a different magnitude for the oxygen). These findings indicate that this binding energy difference is associated with a Fermi level shift. Thus, the Fermi level of the Nb-substituted nanoparticles (IF-Mo$_{1-x}$Nb$_x$S$_2$) is shifted towards lower energies, making them more 'p-type'.

A unique way to test the electrical properties of the nanoparticles is provided by the known technique of chemically resolved electrical measurements (CREM), which is a "top-contact-free" electrical characterization method. This technique allows for the determination of the electrical response of the different nanoparticles. By measuring the current flow to the ground and monitoring the energy shift of a given element in the surface layer during electron bombardment by a flood gun, the internal potential drop in the layer which contains this specific element can be determined.

FIGS. 10A-10C show electrically induced line shifts of Nb(3d) (FIG. 10A), Mo (3d$_{5/2}$) in IF-Mo$_{1-x}$Nb$_x$S$_2$ nanoparticles (FIG. 10B), and Mo (3d$_{5/2}$) in IF-MoS$_2$ nanoparticles (FIG. 10C) under a given electrical input signal (eFG filament current of 1.75 A). The line shifts reflect the local potential changes at addresses associated with the inspected chemical element. In all panels, curve (I) corresponds to 'eFG off' conditions and curve (II) refers to 'eFG on'. It should be noted that the oxidized Nb exhibits a large shift while the reduced Nb signal is practically not shifted at all. Comparison of FIGS. 10B and 10C demonstrate the effect of Nb substitution on the Mo line shift, indicating improved conductance in the IF-Mo$_{1-x}$Nb$_x$S$_2$ nanoparticles. This experiment is conducted with the nanoparticles deposited on a gold substrate, and complementary CREM data (not shown) is recorded also for the gold, carbon and oxygen signals. All gold substrates exhibited small electron-beam induced shift of the XPS signal, signifying a relatively good Ohmic back contact.

The film of the IF-MoS$_2$ nanoparticles exhibits measurable line shifts upon electron irradiation with the eFG (Mo line in FIG. 10C). This line shift directly reflects a local potential change, due to the internal resistance of the nanoparticle (under the incident electron flux). The internal resistance of the nanoparticle is estimated to be on the order of a few hundred k Ohms. In contrast, the Mo line of the IF-$Mo_{1-x}Nb_xS_2$ nanoparticles does not show any observable line shift (FIG. 10B), indicating that the nanoparticle resistance is low, such that only small, undetectable potential changes can evolve under the applied electrical signal (the input eFG current). Interestingly, the Nb line itself consists of two electrically different components (FIG. 10A). As mentioned above, the low binding energy components (203.70 eV and 204.80 eV) are attributed to atoms incorporated within the Mo-based particles, and they do not shift under the input flux of the electrons. The other component (at 208.40 eV), which is associated with external oxidized Nb species, does exhibit a strong line shift under the electron flux (FIG. 10A). This shift is similar in magnitude to that of the oxygen line (not shown). Based on complementary data (EFTEM described above), the oxidized Nb appears to comprise a subnanometer coating on the nanoparticle surface. This means that contact electrical measurements (e.g. with AFM, as will be described below) might be subjected to an oxide barrier, which is not the case for the non-contact CREM approach.

Finally, the CREM results are in good agreement with the observation of XPS-derived Fermi level shift upon Nb-substitution, which is manifested through the shift of the Mo and S lines to lower energies in the Nb substituted (alloyed) IF nanoparticles. The incorporation of Nb into the semiconducting IF-$MoS_2$ nanoparticles induces enhanced p-type behavior, where the Fermi level shifts down towards the valence band, and the electrical conductance increases accordingly.

Thus, the XPS analysis shows two low binding-energy doublets corresponding to reduced Nb moieties, presumably within the dichalcogonide layers, and a high-energy doublet associated with oxidized Nb, which is present on the surface (from complementary analysis, as also revealed by energy filtered TEM). One of these reduced species corresponds to the sheets of $NbS_2$, while the other one to alternate substitutional sites of individual Nb atoms at Mo atomic sites.

Figure 11A:
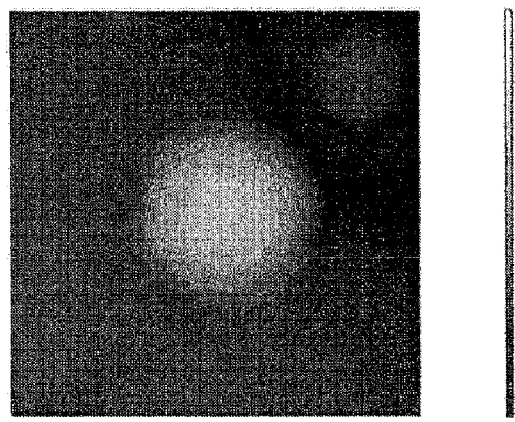
FIGS. 11A-11C exhibit AFM measurements carried out on an IF-Mo$_{1-x}$Nb$_x$S$_2$ nanoparticle (FIG. 11A) AFM image, (FIG. 11B) I/V curves carried out on the nanoparticle (dashed lines), (FIG. 11C) corresponding dI/dV vs V plots. In both FIG. 11B and FIG. 11C, the corresponding plots of the IF-MoS$_2$ nanoparticle are shown for comparison (solid lines))
Figure 11B:
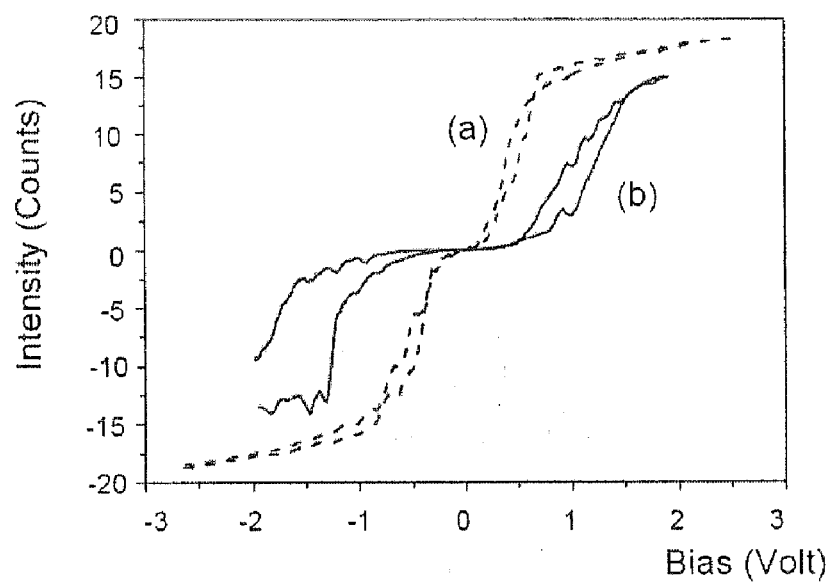
Figure 11C:
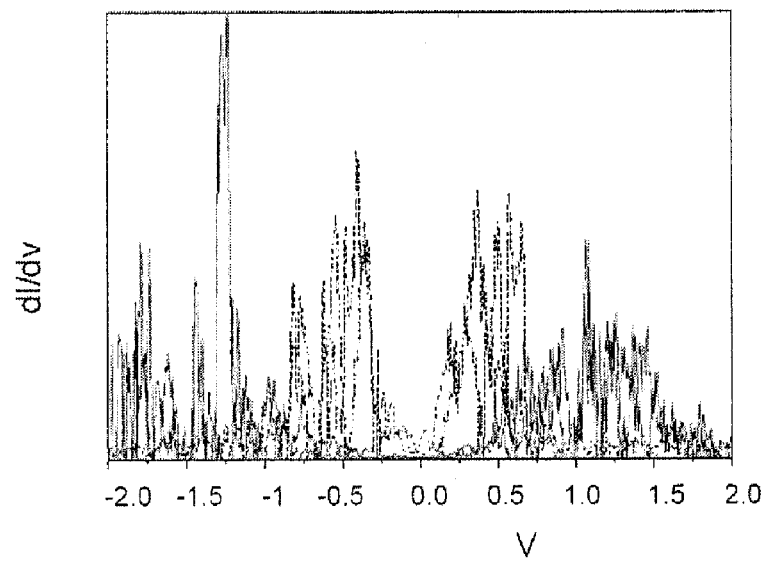

Reference is made to FIGS. 11A-11C, showing the results of conducting atomic force microscopy measurement (c-AFM) measurements carried out on an individual IF-$Mo_{1-x}Nb_xS_2$ nanoparticle (series-2), and also AFM measurements carried out on IF-$MoS_2$ nanoparticles for comparison. FIG. 11A shows the AFM image of the IF-$Mo_{1-x}Nb_xS_2$ nanoparticle (series-2), FIG. 11B shows I/V curves, and FIG. 11C shows corresponding dI/dV vs V plots. In FIGS. 11B and 11C, the corresponding plots of the IF-$MoS_2$ nanoparticle are shown for comparison (solid lines).

Whereas the IF-$MoS_2$ nanoparticle exhibits a noticeable bandgap region where no current flows, the IF-$Mo_{1-x}Nb_xS_2$ nanoparticles exhibit only an inflection in the curve where current is reduced, but not to zero. Furthermore, the current rise is significantly sharper for the IF-$Mo_{1-x}Nb_xS_2$ nanoparticles. Calculated dI/dV vs V traces of the curves in FIG. 10B, are shown in FIG. 10C. From these curves, the effective bandgap was measured. In both cases, the distribution is quite broad, representing both variations between the different particles, and experimental fluctuations. An average bandgap of ~1.05 eV (±0.2 eV) was estimated for a canonical ensemble of the IF-$MoS_2$ nanoparticles. This result are indicative of that the IF-$MoS_2$ nanoparticles are semiconductors. The band gap of the bulk 2H—$MoS_2$ phase is 1.2 eV. The somewhat smaller gap of the nanoparticles, compared with the values of the bulk phase, may be attributed to the expansion of c/2 (vdW gap) in various regions of the nanoparticles, due to the strain involved in the folding of the structure. An alternative explanation for the reduced gap of the nanoparticles is that sub-bandgap states, which emanate from structural imperfections or edge dislocations, may serve as mediators for tunneling of charge and hence increase the current under bias. In contrast to the IF-$MoS_2$ nanoparticles, the IF-$Mo_{1-x}Nb_xS_2$ exhibits a metallic character. A minority of the particles measured (15%) showed an apparent gap of up to 0.6 eV which indicates the presence of an additional barrier in the tunneling gap. This is provided by the sheathed amorphous niobium oxide layer observed in the TEM measurements. It is possible that this layer is disrupted and penetrated by the tip in most measurements.

The experimental I/V curves can be further analyzed to derive the effective resistance. The values were determined over a 0.3 V bias range starting directly after the current rises above the noise level. After accounting for the intrinsic point contact resistance of the tip as measured on the clean Au surfaces, the IF-$Mo_{1-x}Nb_xS_2$ nanoparticles have resistance of 10 MOhm, as opposed to 60 MOhm for the undoped IF-$MoS_2$. Considering the existence of an oxide layer in some of the particles examined by TEM, part of this resistance is mediated by the quality of the contact.

Thus, the technique of the present invention provides for modifying the electronic properties of the nanostructures. The effect of Mo→Nb substitution on the electronic structure of $MoS_2$ nanotubes (not fullerene-like nanoparticles though) has been investigated using density functional tight binding method (DFTB) [6]. The Mo→Nb substitution leads to the formation of new states in the band gap of $MoS_2$ nanotubes. With increasing Nb content (i.e. with decreasing number of electrons in comparison with "pure" $MoS_2$), the Fermi level is shifted, and correspondingly the density of states (DOS) near the Fermi energy is increased, consistent with the present XPS and CREM data. As a consequence, the DOS close to the Fermi level of Nb-substituted $MoS_2$ can be tuned over a wide range, by the degree of substitution. Also the IF-$Mo_{1-x}Nb_xS_2$ nanoparticles exhibit metallic character, independent of the substitution patterns of the Nb atoms.

Figure 12A:
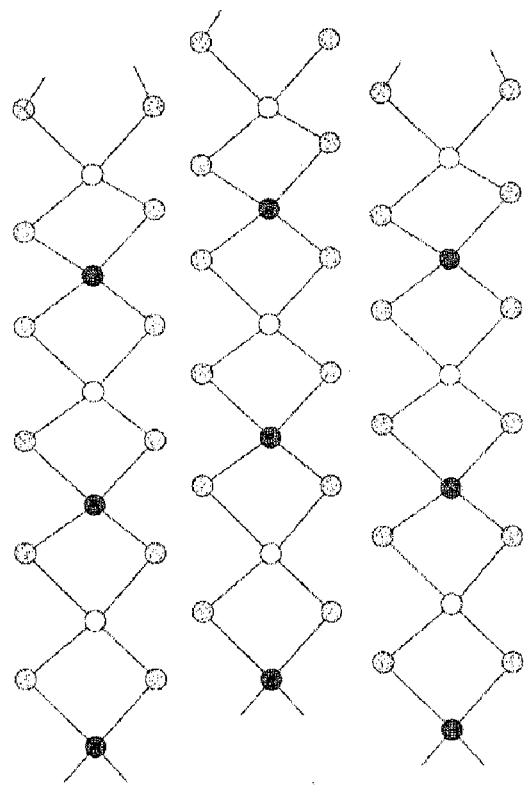
FIGS. 12A to 12C show a schematic presentation of the substitutional patterns of the Nb atoms within the IF-Mo$_{1-x}$Nb$_x$S$_2$ lattice.
Figure 12B:
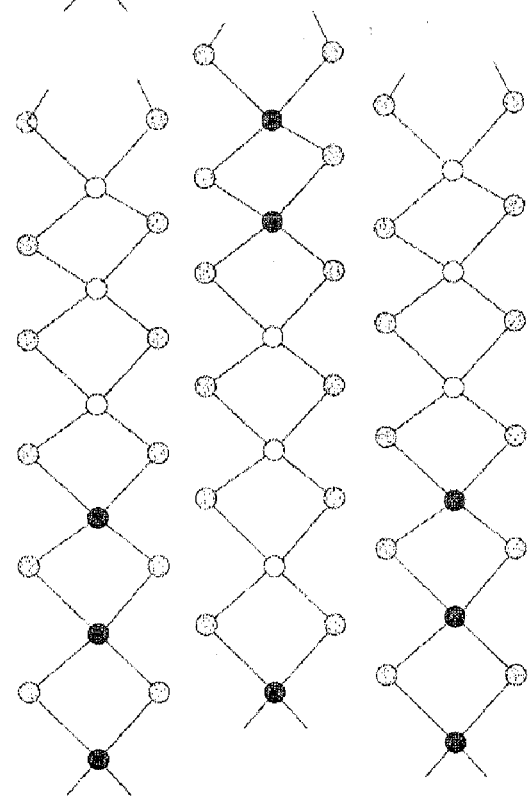
Figure 12C:
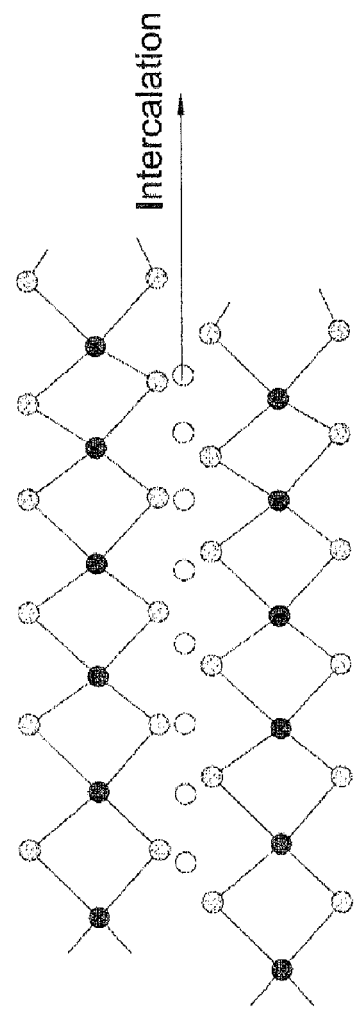

Referring to FIGS. 12A to 12C, there are shown substitutional patterns of the Nb atoms within the IF-$Mo_{1-x}Nb_xS_2$ lattice, presenting three types of Nb incorporation within the lattice of $MoS_2$ based on the above described analysis of X-ray diffraction data, and TEM and XPS analysis. FIG. 12A represents the case where there are continuous spreads of both types of atoms within each layer alternating randomly (turbostatically). In FIG. 12B, Mo and Nb atoms are alternately incorporated into the lattice of $MoS_2$. It should be noted that if the concentration of the Nb atoms goes below 1% (or generally, does not exceed 1%), these atoms will generally prefer to be spread as individual atoms in the Mo-dominated lattice. In this case, the physical properties of the $MoS_2$ lattice, like the energy gap, are preserved. In this case the Nb atoms behave like a classical (hole) dopant making the lattice p-type. This situation provides the best conditions for the control of the electrical properties of the lattice, from intrinsic (undoped) to the case where as much as $10^{20}$ $cm^{-3}$ Nb atoms are substituted into the Mo sites, making it a heavily doped hole (p-type) conductor. FIG. 12C shows the unlikely case of intercalation of atoms in the van der Waals gap between the layers. The Nb incorporation could be a combination of the first two types.

The two kinds of Nb species could have a different effect on the electronic properties of the IF-$Mo_{1-x}Nb_xS_2$ nanoparticles. Individual Nb atoms in substitutional sites could play the role of a dopant, leading to a downwards shift of the Fermi level closer to the valence band and increased conductivity. Patches of $NbS_2$ sheets interspersed in the $MoS_2$ lattice impose a metallic character on the nanoparticle. The apparent 'soft gap', manifested by the reduced (but not totally suppressed) current around zero bias, as measured by conductive AFM, could be also influenced by the size of the nanoparticles, with the larger nanoparticles exhibiting larger gap [11]. Hence, the Nb incorporation into the 2H—$MoS_2$ lattice of the IF reduces the resistivity of the nanoparticle substantially.

Thus, the present invention provides novel IF-nanostructures, generally of the formula $A_{1-x}$-$B_x$-chalcognide, where A is a metal or transition metal doped by another metal or transition metal B different from A, and $x \leq 0.3$. In the above described not-limiting example, IF-$Mo_{1-x}Nb_xS_2$ nanoparticles have been prepared starting from the respective chloride vapor precursors in addition with $H_2S$. The IF-$Mo_{1-x}Nb_xS_2$ nanoparticles have been extensively characterized by XRD, TEM-EDS, HRTEM-EELS and XPS. From the detailed investigation of the electrical properties by AFM analysis, the substitution of Nb for Mo involves a semiconductor to metallic type transformation (IF-$MoS_2$ are known to be semiconductors). This study is an example of heteroatom substitution in the case of IF-nanoparticles opening up a wide range of possibilities including varying the electronic behavior of the IF-nanoparticles, in superconductivity and in spintronics.

Example 2

Synthesis of $Mo_{1-x}Re_xS_2$ IF-nanoparticles

The synthesis was carried out in a method similar to the above-described synthesis of the IF-$Mo_{1-x}Nb_xS_2$ nanoparticles. The precursors in this case are $MoCl_5$ (m.pt=194° C.; b.pt=268° C.) and $ReCl_5$ (m.pt=220° C.).

Figure 13A:
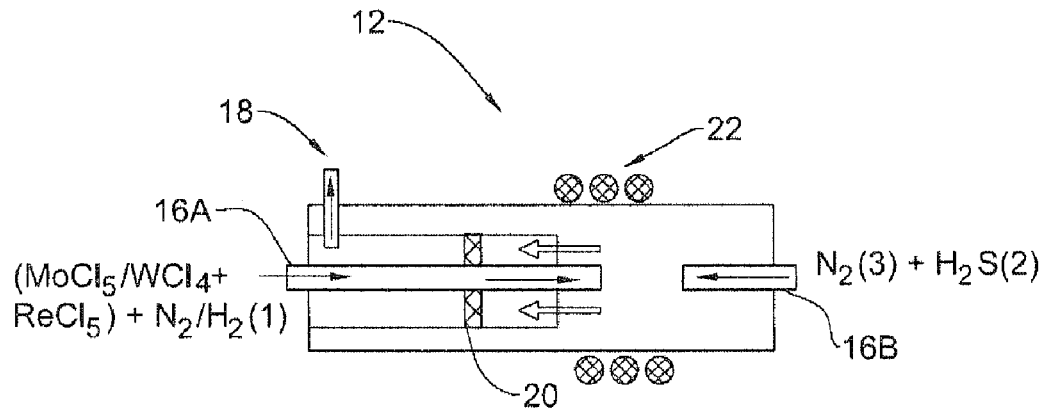
FIGS. 13A and 13B show an experimental setup used in other examples of the invention including a main reactor (FIG. 12A) and a separate auxiliary furnace (FIG. 12B).
Figure 13B:
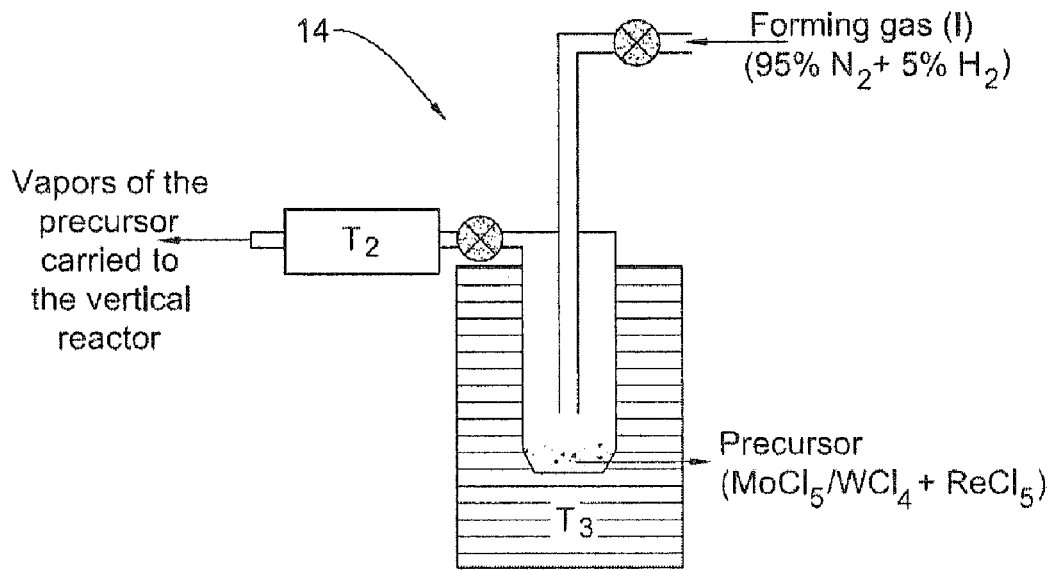

FIGS. 13A and 13B show together an experimental setup used in the present example. Reference numbers are the same as those used in FIG. 2. Initially, the precursors were heated (temperature $T_3$) in a separate auxiliary furnace 14 (FIG. 13B) and the respective vapors were carried while heated at a temperature $T_2$ into the main reactor 12 (FIG. 13A). The latter being a horizontal reactor, although one may carry the reaction in a vertical reactor similar to that described previously in the case of the synthesis of IF-$Mo_{1-x}Nb_xS_2$ nanoparticles, with reference of FIG. 2. As for the horizontal reactor, which was previously used for the synthesis of IF-$TiS_2$ nanoparticles, it now has been modified for the synthesis of the IF-$Mo_{1-x}Re_xS_2$ nanoparticles and nanotubes. The $MoCl_5$ and $ReCl_5$ vapors were initially formed from the respective solid material at the auxiliary/precursor furnace 14 (FIG. 13B). The temperature of the precursor source was kept usually between 220° C. and 250° C. which is close to the boiling point of the chlorides. The formed vapors were introduced into the main reactor 12 (FIG. 13A) through inlet 16A by a carrier gas flow ($N_2/H_2$). The $H_2S$ gas diluted with $N_2$ were provided from opposite directions through inlet 16B of the reactor 12 respectively. This enables the reaction to occur in the central hot region of the reactor (associated with a respective furnace), while the product is swept by the flow and collected onto the filter (as described above with reference to FIG. 2). Excess gas leaves the reactor through the opening 18.

The preheating temperature was found to be an important factor determining the amount of precursor supplied to the reaction. The flow-rate of nitrogen through the bottle (10-100 cc/min) affects the stream of the tungsten chloride precursors as well. A small overpressure (1.1 bar) was maintained by using a toxic gas trap filled with NaOH (5%) solution in the gas outlet of the reactor. The temperature of the reaction chamber, where the two gases ($MoCl_5$ and $H_2S$) mix and react, was varied in the range of 800-900° C. The resulting $Mo_{1-x}Re_xS_2$ powder was collected using a filter. Unlike the case of $TiS_2$ synthesized previously, by the use of the modified horizontal reactor and by collecting the product in the filter, the main portion of the product could be collected without losses, and was not swept away by the carrier gas to the trap. The flow-rate of $H_2S$ (5-10 cc/min) was controlled by means of a TYLAN model FC260 mass flow controller. The $H_2S$ was diluted by mixing this gas with a stream of $N_2$ gas (10-200 cc/min in this reaction) using another flow-controller.

Table 4 below shows the parameters and conditions of the reactions carried out for the synthesis of the IF-$Mo_{1-x}Re_xS_2$ nanoparticles.

TABLE 4

| Temperature of the horizontal reactor | Temperature of the auxiliary furnace | Gas flow rates | Size of the IF-$Mo_{1-x}Re_xS_2$ nanoparticles |
|---|---|---|---|
| Series-1<br>$T_1$ = 800° C. | $T_2$ = 220° C.<br>$T_3$ = 250° C. | Forming gas<br>(I) = 50 cc<br>(95% $N_2$ and 5% $H_2$)<br>$H_2S$(II) = 5 cc<br>$N_2$ (III) = 50 cc | ~30-80 nm |
| Series-2<br>$T_1$ = 850° C. | $T_2$ = 220° C.<br>$T_3$ = 250° C. | Forming gas<br>(I) = 50 cc<br>(95% $N_2$ and 5% $H_2$)<br>$H_2S$(II) = 5 cc<br>$N_2$ (III) = 50 cc | 50-80 nm |
| Series-3<br>$T_1$ = 900° C. | $T_2$ = 220° C.<br>$T_3$ = 250° C. | Forming gas<br>(I) = 50 cc<br>(95% $N_2$ and 5% $H_2$)<br>$H_2S$(II) = 5 cc<br>$N_2$ (III) = 50 cc | 50-100 nm IF nanoparticles + nanotubes |

IF-$Mo_{1-x}$–$Re_xS_2$ nanoparticles synthesized at 800° C. (Table 4, Series-1) resulted in both spherical and well-faceted nanoparticles of approximately 300 to 80 nm in diameter and interlayer spacing of approximately 0.62 nm. TEM-energy dispersive X-ray spectroscopy (EDS) and high resolution TEM-electron energy loss spectroscopy (HRTEM-EELS) analysis reveal the presence of Re in the nanoparticles.

Figure 14A:
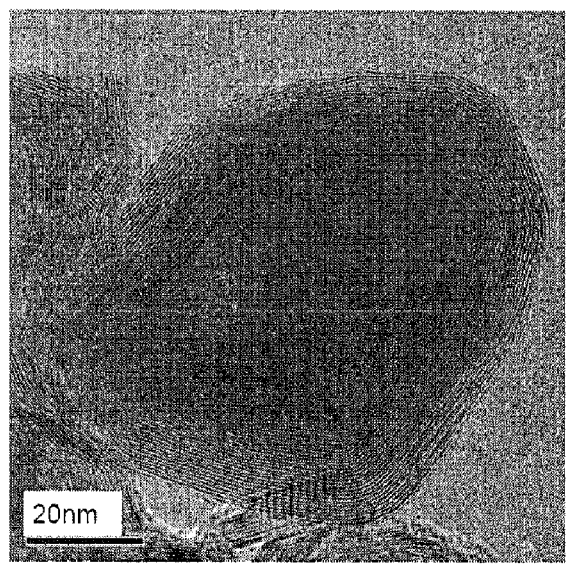
FIGS. 14A-14C show images and EDS spectra of obtained IF-nanostructures.
Figure 14B:
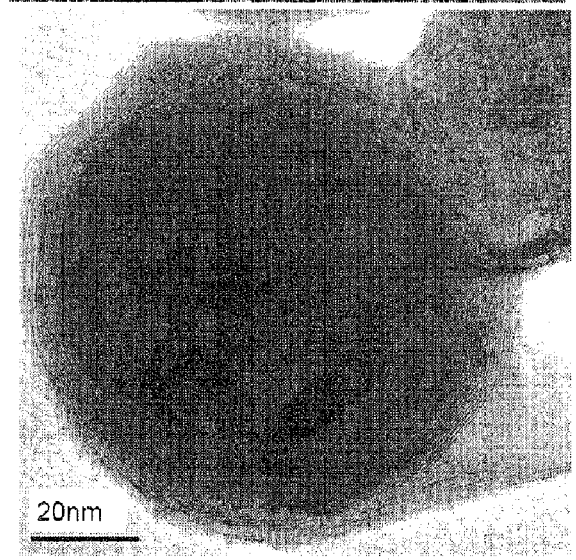
Figure 14C:
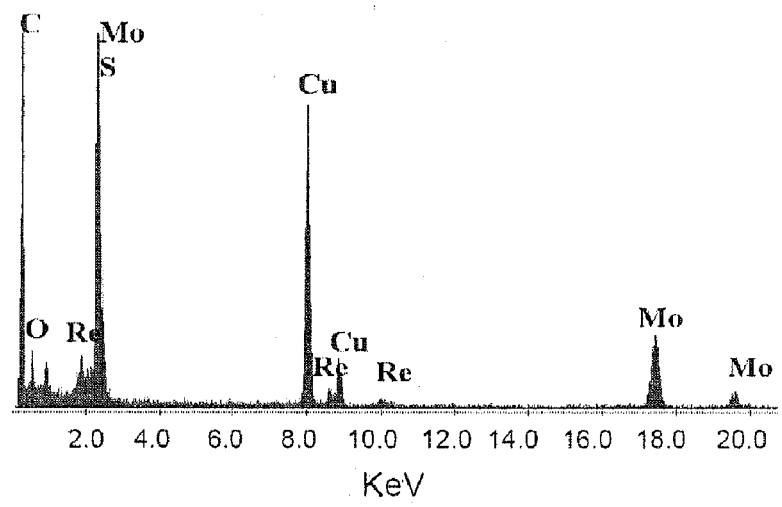

The HRTEM images of the IF-$Mo_{1-x}Re_xS_2$ nanoparticles synthesized at 850° C. (Table 4, Series-2) are shown in FIGS. 14A and 14B. The diameter of the IF-$Mo_{1-x}Re_xS_2$ nanoparticles is in the range of 50-80 nm in diameter. The EDS spectra of the IF-$Mo_{1-x}Re_xS_2$ nanoparticle shown in FIG. 14B is presented in FIG. 14C. Rhenium atoms seem to be uniformly distributed in all the examined nanoparticles, irrespective of their size or shape. The presence of the characteristic and distinct Mo (K,L), S (K) and Re (M,L) lines can be clearly seen. From the TEM-EDS and the HRTEM-EELS analysis the metal to sulphur ratio is determined to be 1:2. The stoichiometry of the IF-$Mo_{1-x}Re_xS_2$ nanoparticles is as follows: Mo:Re:S-0.97 (±0.01): 0.03 (±0.01): 2. Additional TEM-EDS and HRTEM-EELS analyses show that the Mo+Re+S ratio remained nearly constant, independent of the IF nanoparticle diameter and position.

Figure 15A:
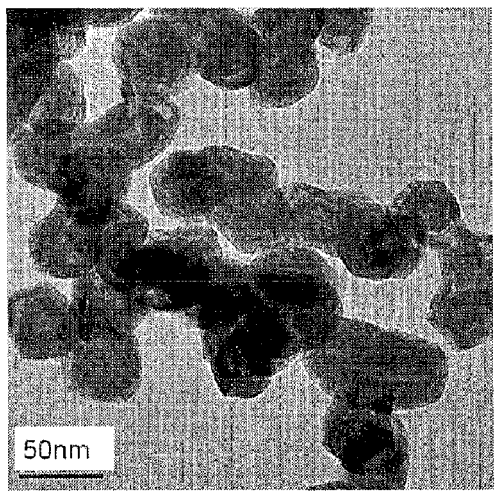
FIGS. 15A-15D show the experimental results.
Figure 15B:
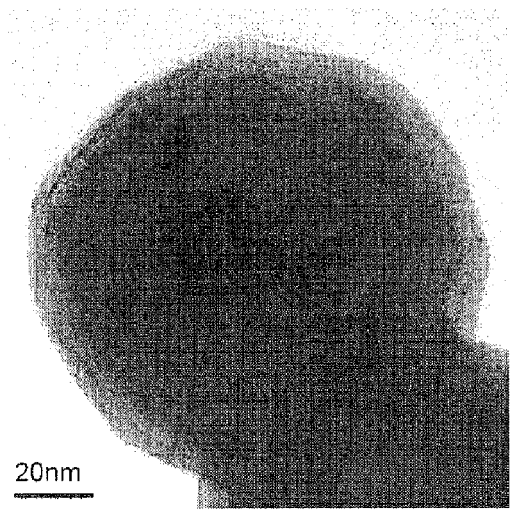
Figure 15C:
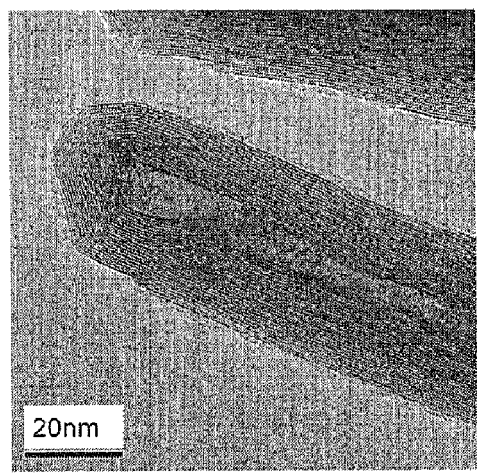
Figure 15D:
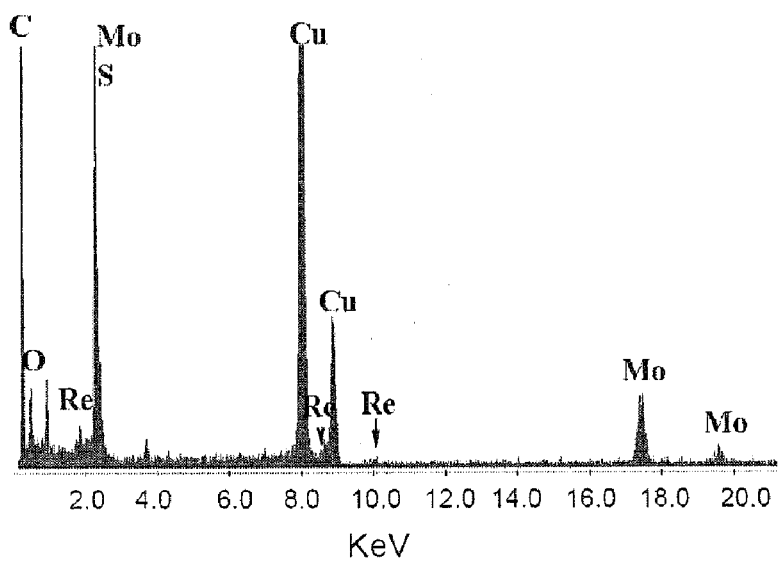

FIG. 15A shows a TEM image of a collection of the IF-$Mo_{1-x}Re_xS_2$ nanoparticles synthesized at 900° C. (Table 4, Series-3). FIG. 15B shows the HRTEM image of a single nanoparticle. The diameter of the nanoparticles is between 50-100 nm at this temperature of synthesis. The presence of Re is ascertained from the EDS analysis carried out on individual as well as a collection of IF-$Mo_{1-x}Re_xS_2$ nanoparticles (FIG. 15D). The presence of the characteristic and distinct Mo (K,L), S (K) and Re (M,L) lines can be clearly seen from the EDS spectra. Apart from obtaining IF-$Mo_{1-x}Re_xS_2$ nanoparticles, nanotubes of Re-doped $MoS_2$ were also obtained at 900° C. (Table 4, Series-3). The nanotubes come in small amounts (~5%). FIG. 15C shows the HRTEM image of one such nanotube. The length of the nanotubes thus obtained is about half a micron, whereas the diameter is about ~40 nm (~25 layers). The interlayer spacing of the nanotube shown in FIG. 15C is ~0.62 nm, which is very similar to that of pure IF-$MoS_2$ [2-4]. The EELS spectra of nanoparticles and nanotubes showed the characteristic Mo ($L_{3,2}$), S (K) and Re ($M_{4,5}$) signals and the amount of Re in the particles was about 1-2 atomic percent. Higher temperatures of synthesis were found to be suitable for the production of the nanotubes. This observation was similar to the synthesis of pure $MoS_2$ and $WS_2$ nanotubes wherein higher temperatures of synthesis (~900° C.) favoured their formation [4].

Figure 16:
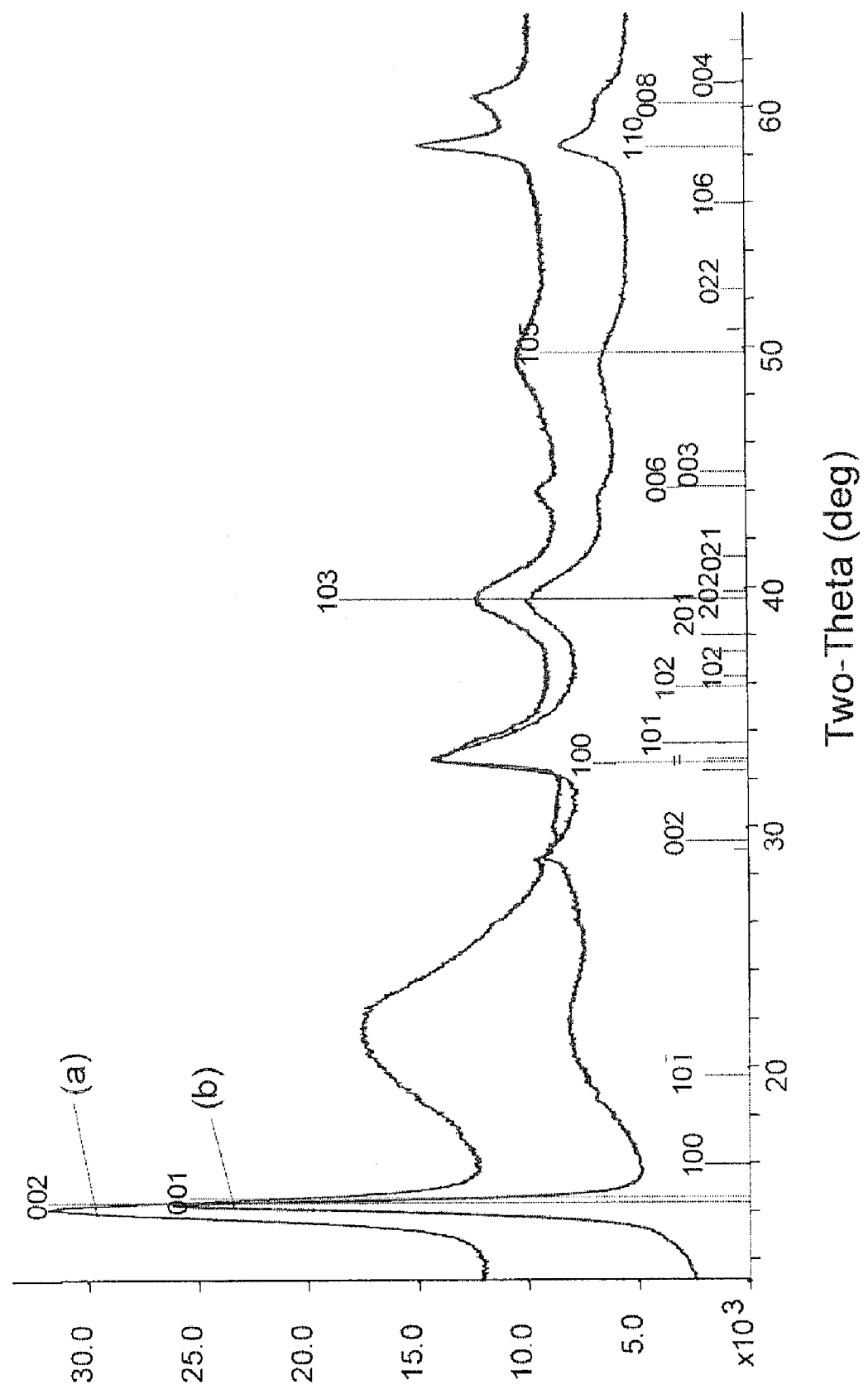
FIG. 16 shows an XRD pattern of IF-Mo$_{1-x}$Re$_x$S$_2$ nanoparticles prepared at (a) 850° C. and (b) 900° C. Standard diffraction patterns of 2H—MoS2 and 2H—ReS2 are also shown for comparison. The asterix (*) in the diffraction pattern correspond to the peak arising from the filter used for collecting the nanoparticles. Also are shown in pattern are the peak of the oxide of Re (ReO$_3$-#) and Mo (MoO$_2$-+) which are undesirable product of the non-optimized reaction.

FIG. 16 shows the XRD pattern of the IF-$Mo_{1-x}Re_xS_2$ nanoparticles synthesized at 850° C. (Table 4, series-2,) and at 900° C. (Table 4 series-3). The standard diffraction patterns of 2H—$MoS_2$, 2H—$ReS_2$ are also shown in the figure for comparison. It can be seen that all the peaks of the sample match well with those of 2H—$MoS_2$. The (002) peak in the XRD pattern was characterized by a shift to a lower angle as compared to the (002) peak in hexagonal 2H—$MoS_2$ crystals indicating a small lattice expansion in the case of the IF nanoparticles and nanotubes [2-4]. This expansion has been attributed to the introduction of strain owing to curvature of the layers [1-4]. Comparison of the full width at half maximum of the (002) peaks (FIG. 16) confirm the TEM data that the size of the nanoparticles obtained at 900° C. is larger than those nanoparticles obtained at 850° C. Any secondary phases of $ReS_2$ have been ruled out from the XRD pattern. However the presence of a small proportion of $ReO_3$ and $MoO_2$ is present as can be seen in the figure. This is in accordance with the TEM observations wherein it is seen that the core of some of the nanoparticles reveal the presence of an oxide $ReO_2$ and $ReO_3$ that may undergo sulfidization). Table 5, summarizes the XPS derived atomic concentrations of the IF-$Mo_{1-x}Re_xS_2$ nanoparticles (Table 4, series-3).

TABLE 5

XPS-derived compositions of the IF-$Mo_{1-x}Re_xS_2$ nanoparticles (Series 3 =, Table 4) given in atomic percentages.

| Element | Atomic Concentration [%] |
| --- | --- |
| Re | 0.02 |
| Mo | 2.98 |
| S | 5.78 |
| O | 37.55 |
| C | 28.50 |
| Si | 21.98 |

The characteristic Re (4f) signal is clearly seen along with that of Mo ($3d_{5/2}$) and S ($2p_{3/2}$) in the spectra, however its quantity (~1%), is of a relatively large uncertainty, due to the neighbouring Mo (3p) signal. The values in Table 5 is an average over a number of experiments (10 experiments) and is in accordance with the atomic percentage of Re obtained with HRTEM-EELS.

The binding energies of Mo and S exhibit a marked difference when the Re-substituted and the unsubstituted IF samples are compared. This is a clear evidence for the incorporation of Re into the Mo-based particles. The observed difference, is practically identical for the Mo and S lines, $\Delta=200\pm100$ meV, and is verified to be beyond any possible charging effect. In these experiments, the charging conditions of the sample were changed systematically by varying the flux of the electron flood gun. Additionally, reference lines like that of the gold substrate and the carbon contamination do not show the relative shifts in the binding energy. It is therefore concluded that the $\Delta$ shift arises from the Re incorporation into the lattice which raises the $E_F$ upwards, thus to making the nanoparticles more n-type.

Figure 17:
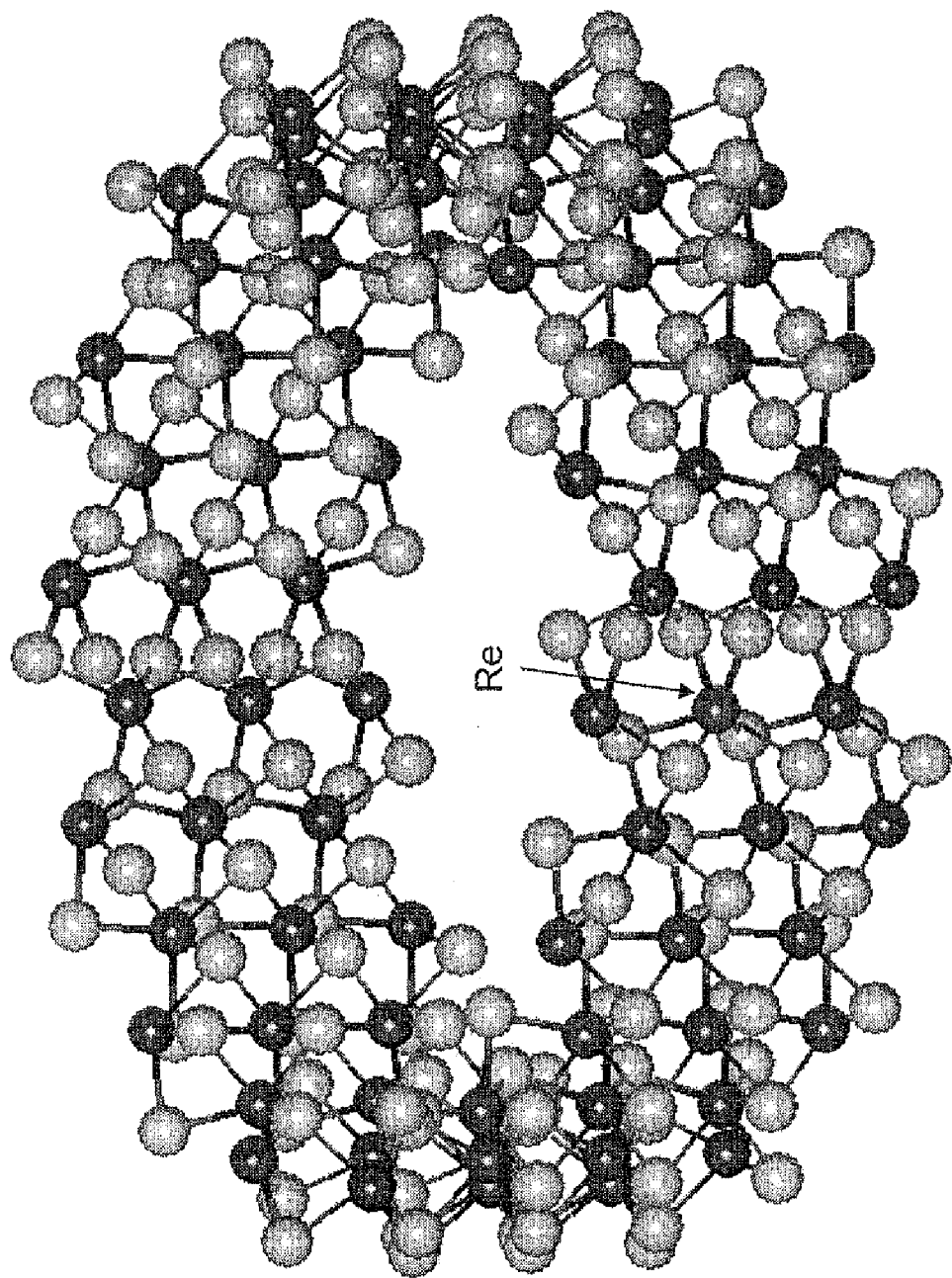
FIG. 17 shows a schematic drawing of the structure of a fragment of Re-doped (14,14) MoS$_2$ nanotube.

Turning to FIG. 17, the figure demonstrates schematically a possible $MoS_2$ nanoparticle having a Re atom incorporated therein.

Example 3

Synthesis of $W_{1-x}Re_xS_2$] IF-nanoparticles

The synthesis was carried out in a method and an apparatus similar to the above-described synthesis of the IF-$Mo_{1-x}Re_xS_2$ nanoparticles. The precursors in this case are $WCl_4$ (m.pt=300° C.) and $ReCl_5$ (m.pt=220° C.).

The temperature of the precursor source was kept usually between 275° C. and 325° C. which is close to the boiling point of the chlorides. The preheating temperature was found to be an important factor determining the amount of precursor supplied to the reaction. Table 6 shows details of the reactions carried out for the synthesis of the IF-$W_{1-x}Re_xS_2$ nanoparticles

TABLE 6

| Temp of horizontal reactor | Temp of the auxiliary furnace | Gas flow rates | Size of the IF-$W_{1-x}Re_xS_2$ nanoparticles |
| --- | --- | --- | --- |
| Series-1 $T_1 = 850°$ C. | $T_2 = 300°$ C. $T_3 = 325°$ C. | Forming gas (I) = 100 cc (95% $N_2$ + 5% $H_2$) $H_2S(2)$ = 10 cc | ~100 nm |

TABLE 6-continued

| Temp of horizontal reactor | Temp of the auxiliary furnace | Gas flow rates | Size of the IF-$W_{1-x}Re_xS_2$ nanoparticles |
|---|---|---|---|
| Series-2 $T_1 = 900°$ C. | $T_2 = 300°$ C. $T_3 = 325°$ C. | $N_2(3) = 50$ cc Forming gas (I) = 100 cc (95% $N_2$ + 5% $H_2$) $H_2S(2) = 10$ cc $N_2(3) = 50$ cc | 50-75 nm |

Figure 18A:
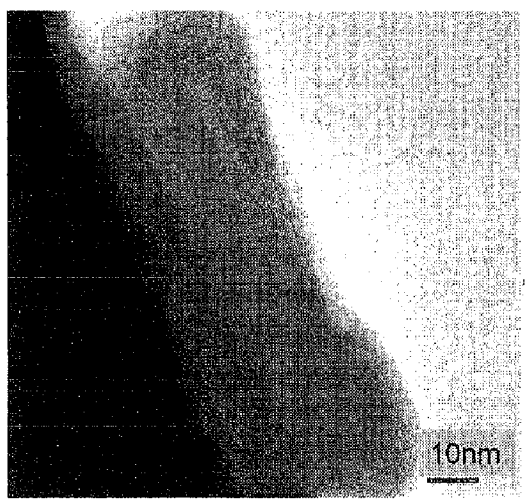
FIGS. 18A-18D show the HRTEM images of IF-W$_{1-x}$Re$_x$S$_2$ nanoparticles synthesized at 900° C.
Figure 18B:
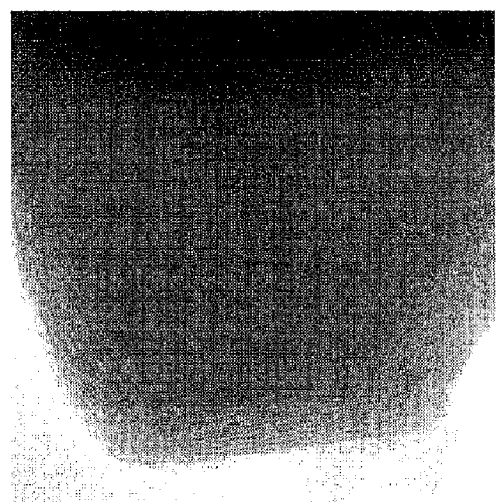
Figure 18C:
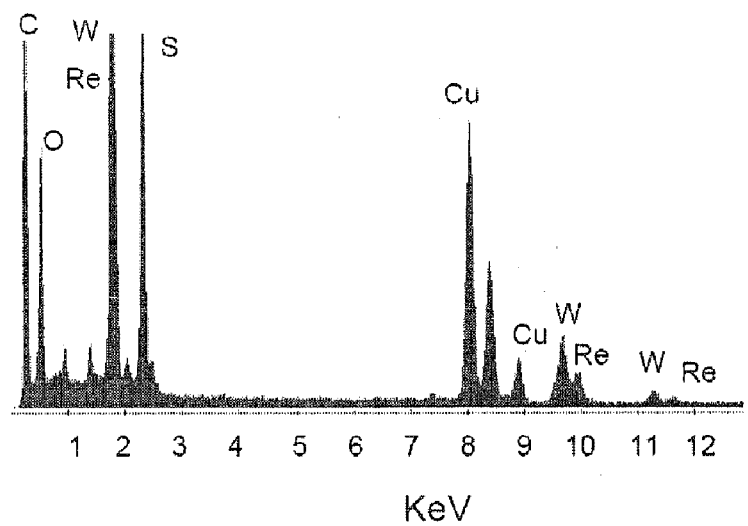
Figure 18D:
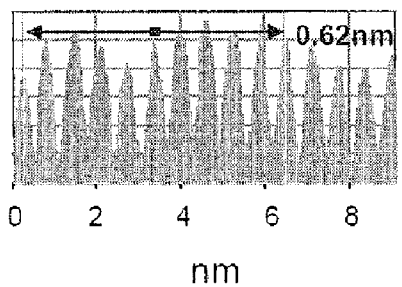

Shown in FIGS. 18A, 18B are the HRTEM images of IF-$W_{1-x}Re_xS_2$ nanoparticles synthesized at 900° C. (Table 6, Series-2). The diameter of the IF-$W_{1-x}Re_xS_2$ nanoparticles is found to be in between 50-75 nm in this set of experimental conditions. The nanoparticle in FIG. 18A is well-elongated whereas the nanoparticle in FIG. 18B is clearly faceted—the differences arising from different temperatures (above 850° C.). The interlayer spacing of the particle is found to be 0.62 nm as shown by the line profile in FIG. 18D (inset). The similarity to the value of the interlayer spacing of pure IF-$WS_2$ suggests that here again the Re is present in lower percentages. The presence of Re is confirmed by TEM-EDS analysis. Shown as an inset in FIG. 18C is the EDS spectrum revealing the characteristic W(L,M), Re(L,M) and S(K) lines. The composition as ascertained from TEM-EDS analysis is found to be as follows: W:Re:S-0.97 (±0.01): 0.03 (±0.01): 2.

In the present case both XRD and HRTEM indicate that Re is present as a dopant in the lattice (for both $MoS_2$ and $WS_2$) and not as an intercalant since the presence of Re as an intercalant would result in an additional lattice expansion in the spacing of the (002) layers [1,5].

The following are additional examples of the reactors setups and experimental methods for the synthesis of $MoS_2$, $WS_2$ doped with Re and Nb.

Example 4

Figure 19:
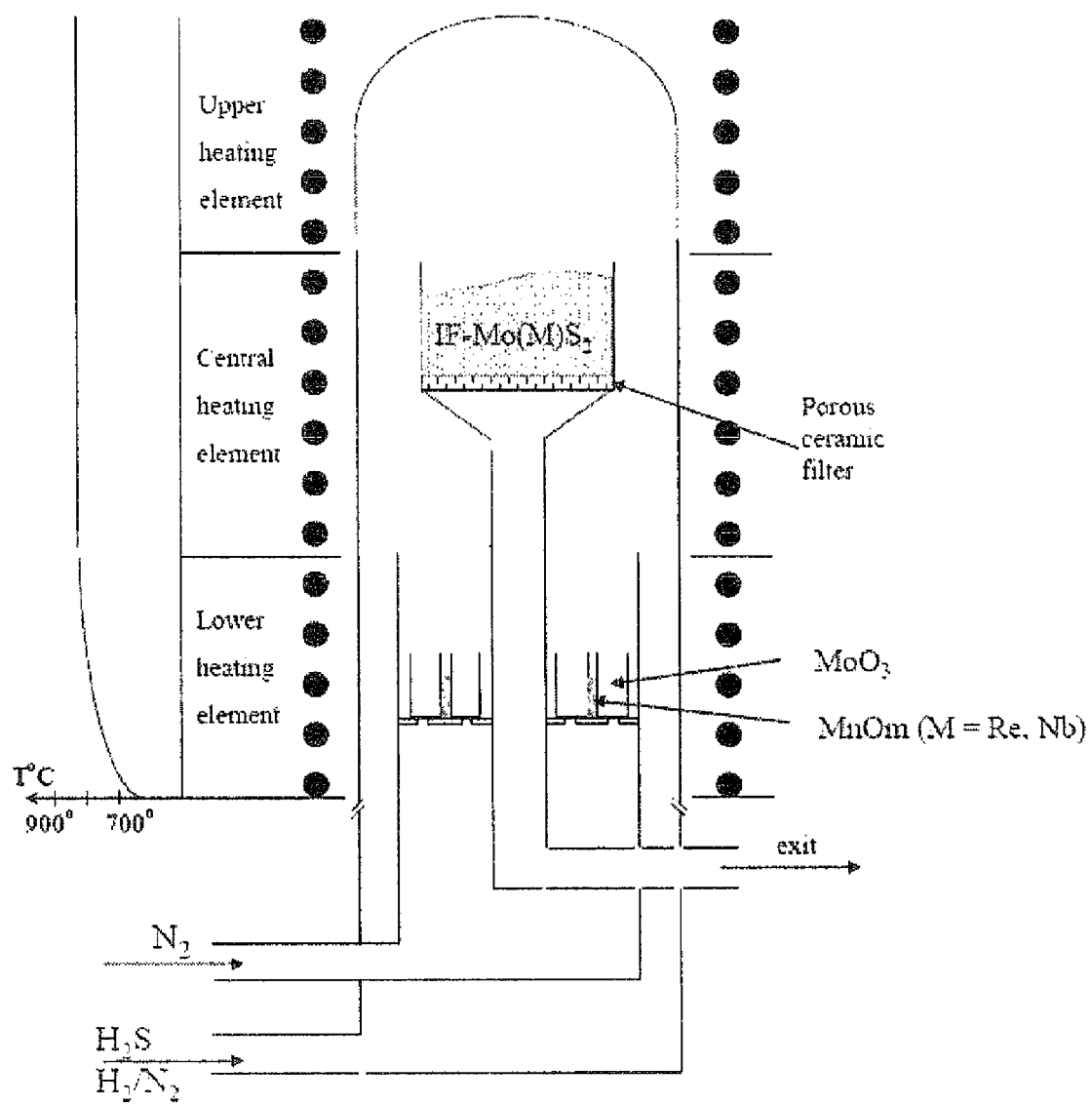
FIG. 19 shows a reactor used in other examples of the invention suitable for the manufacture of IF-nanostructures of the present invention

Referring to FIG. 19, there is shown a vertical reaction chamber 12 (associated with a separate evaporation chamber which is not specifically shown here) configured and operable for the manufacture of IF nanostructures of the present invention. The same reference numbers are used for identifying components that are common in all the examples of the reactor set-ups. In the present example, the reactor 12 is used for the growth of Re (Nb) do-doped IF-$MoS_2$ nanoparticles from $MoO_3$ and $ReO_3$ ($Nb_2O_5$) powder and $H_2S$ gas. The reaction chamber 12 has first and second inlet units 16A and 16B for flowing therethrough reacting materials $H_2S$ and $H_2/N_2$; an outlet unit 18 for gas exit; and a filter 20. The reactor 12 is made of three concentric quartz glass tubes 12A, 12B and 12C which are placed in a three zone oven 22. A series of 10 crucibles, generally at 24, are placed in the middle concentric tube 12B. Each crucible 24 has smaller and larger concentric parts. The powder of metal or transition metal B oxide precursor (0.5 g of $MoO_3$ in the present example) is placed in the outer crucible, and the metal or transition metal A oxide precursor (<1 wt % of $ReO_3$ in the present example) is placed in the inner part of the crucibles. The temperature profile TP of the reaction is shown also in the figure.

Figure 20:
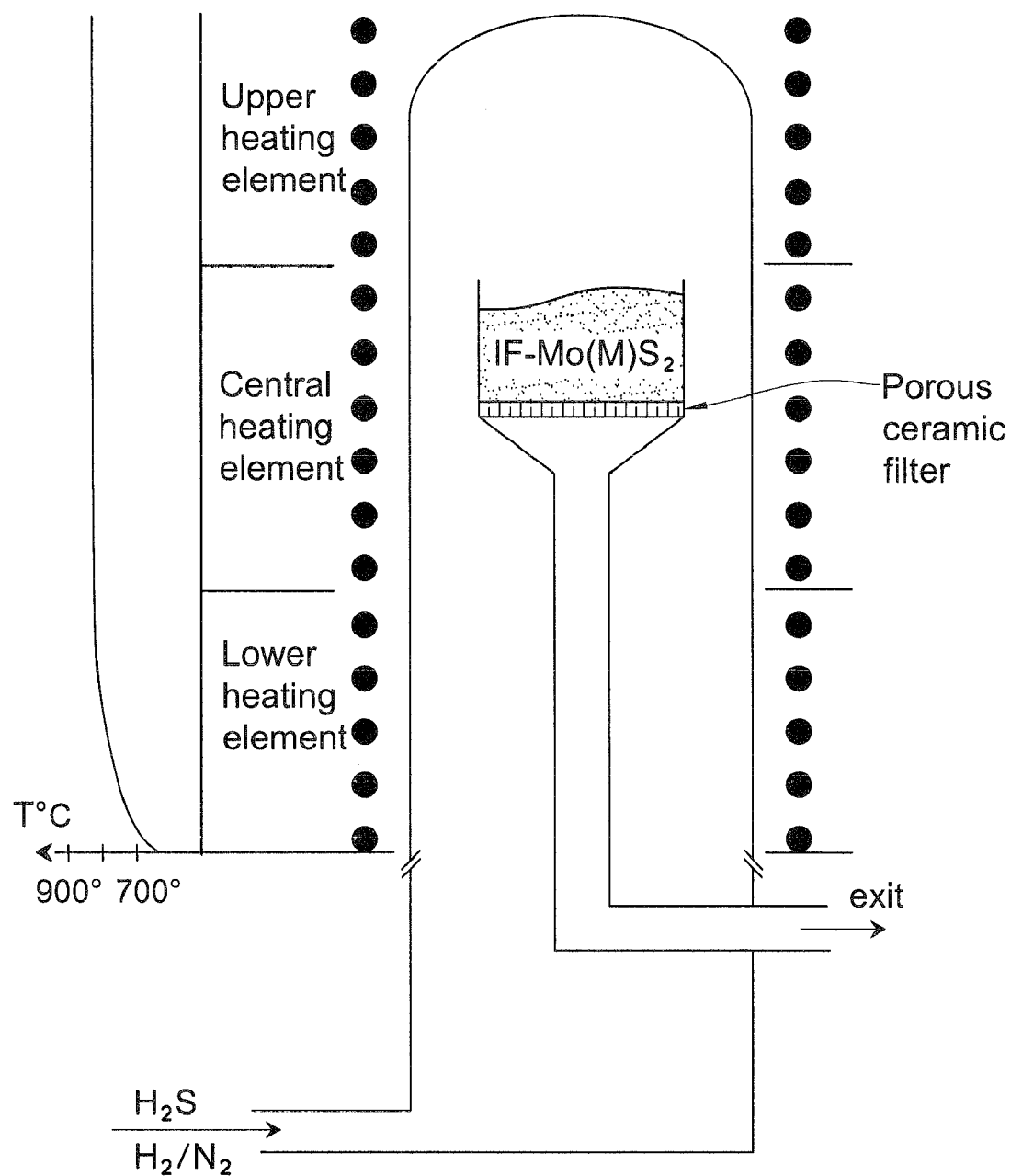
FIG. 20 shows a reactor used for annealing of the IF-nano structures produced in the reactor depicted in FIG. 19.

After 3 hr the product is retracted from the main reactor 12, and the annealing step is continued for another 20-30 hr at 860-870° C. in another (auxiliary) reactor 120 shown in FIG. 20. The reactor 120 has inlet unit 16, outlet 18, filter 20, and is formed by two concentric tubes 120A and 120B mounted in a three zone oven 22.

Figure 21A:
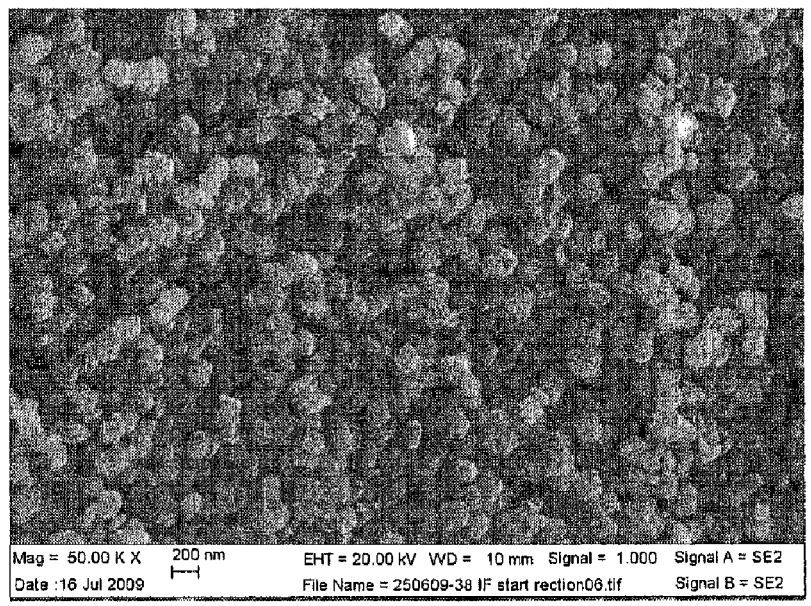
FIGS. 21A-B show images of Re-doped IF-MoS2 nanoparticles synthesized in the reactors depicted in FIGS. 19 and 20.
Figure 21B:
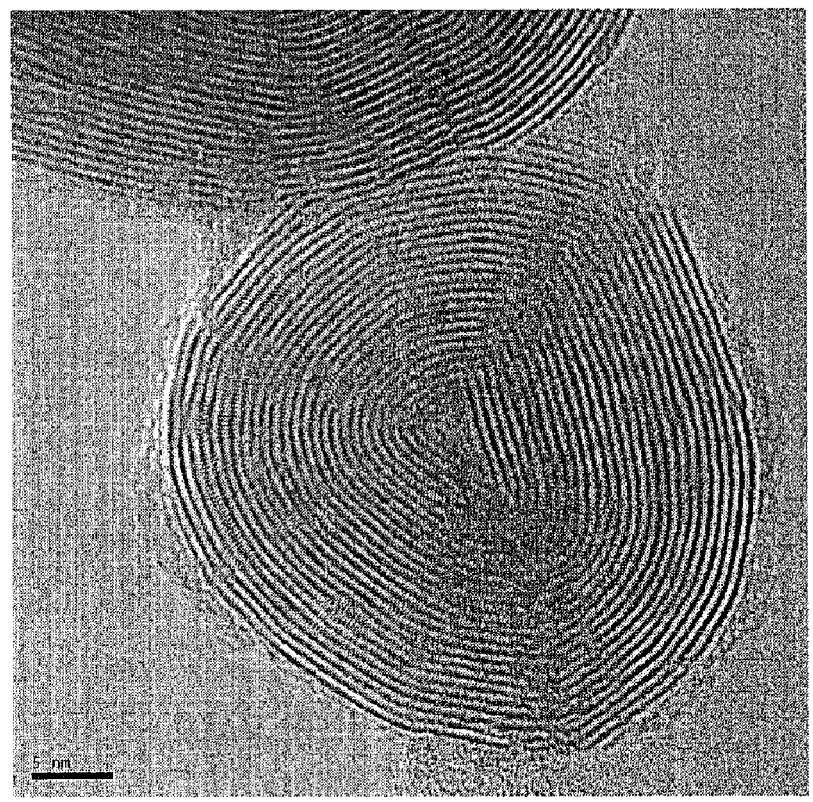

FIG. 21a shows a scanning electron microscopy (SEM) of a typical Re-doped IF-$MoS_2$ nanoparticle synthesized in this fashion. The IF-$MoS_2$ nanoparticles appear to be squashed. Careful examination of the product shows that the entire product consists of such nanoparticles with no bulk (2H platelets) analogues of $MoS_2$. FIG. 21b shows a transmission electron microscopy (TEM). This and other TEM images show that in terms of crystalline perfection, one sees no difference between those nanoparticles and the ones synthesized without Re.

Example 5

Figure 22:
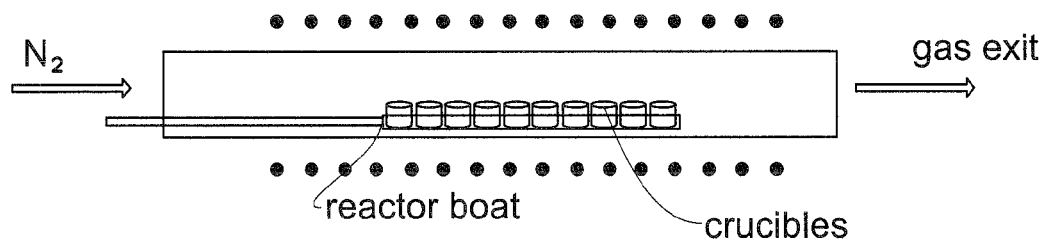
FIG. 22 shows an auxiliary reactor to prepare a solid solution of a precursor for the manufacture of IF-nanostructures of the present invention.

In this example the main reactor 12 is generally similar to that of FIG. 19, but instead of using the two oxide $MoO_3$ and $ReO_3$ precursors separately, a new auxiliary reaction chamber 130 shown in FIG. 22 is used to prepare a solid solution of $Re_xMo_{1-x}S_2$ from $Mo_xRe_{1-x}O_3$ powder. To this end, the $Mo_xRe_{1-x}O_3$ powder is prepared in the following manner: Two weighted powders are grinded carefully in air. Afterwards, ethanol is added to the mixture in the ratio 2:1 ethanol/powder ratio and left in an ultrasonic bath for 5 min under high intensity irradiation. After drying in air, the powder is grinded and again put in crucibles and insert to the horizontal reactor 130 of FIG. 22. The so-prepared $Mo_xRe_{1-x}O_3$ powder is placed in the crucibles 24, which are presented here by a single compartment. The reaction with $H_2S$ is carried out according to a procedure similar to the above described examples to prepare the solid solution. Once ready, the solid solution is placed in the reactor 12 (see FIG. 19) and the temperature is gradually raised to 650° C. under nitrogen atmosphere. The sample is heated at this temperature for 8 hr and then is left to cool down naturally under $N_2$ gas flow.

Example 6

Figure 23:
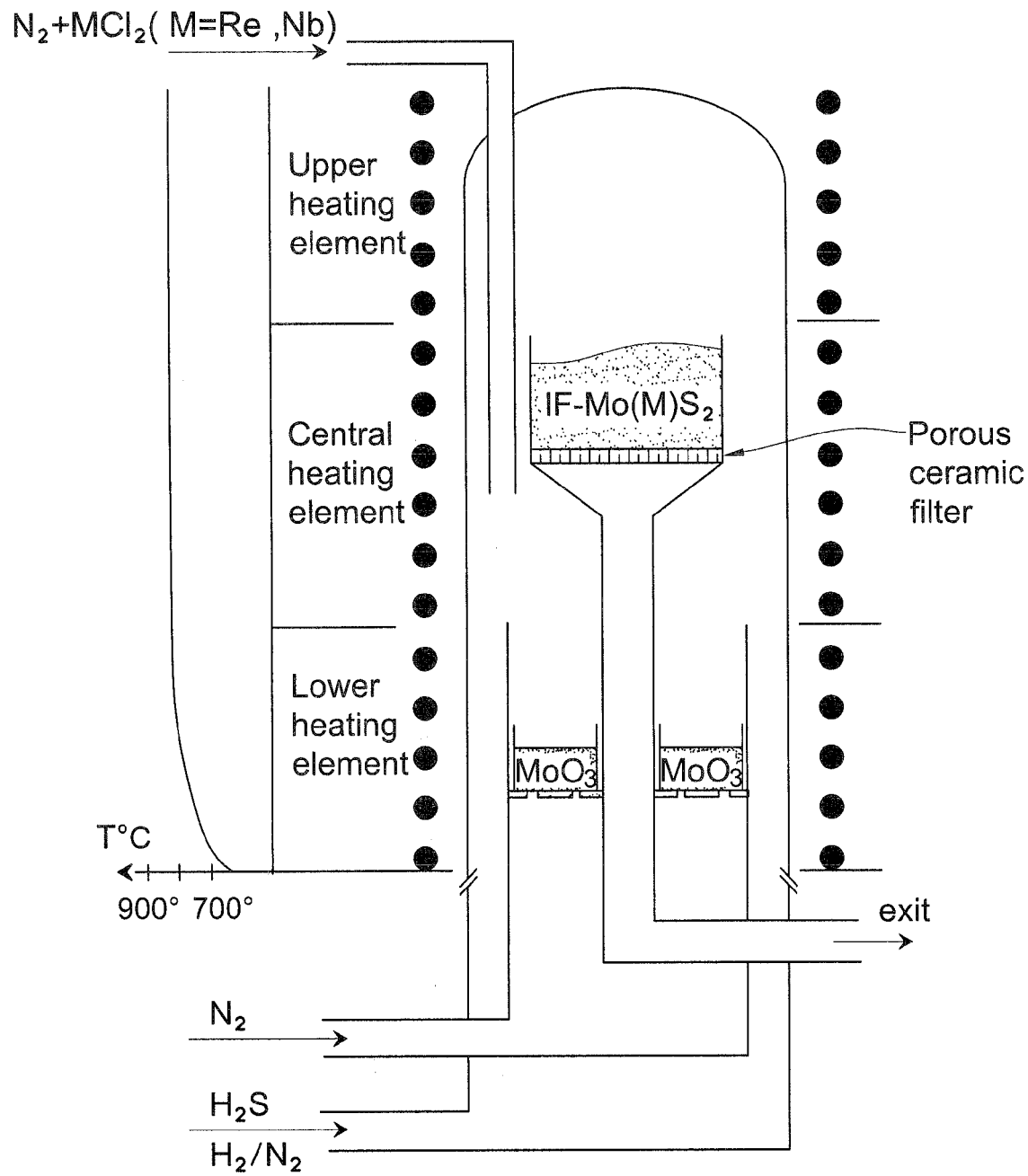
FIG. 23 shows a reactor used in other examples of the invention suitable for the manufacture of IF-nanostructures of the present invention using volatile precursors.
Figure 24:
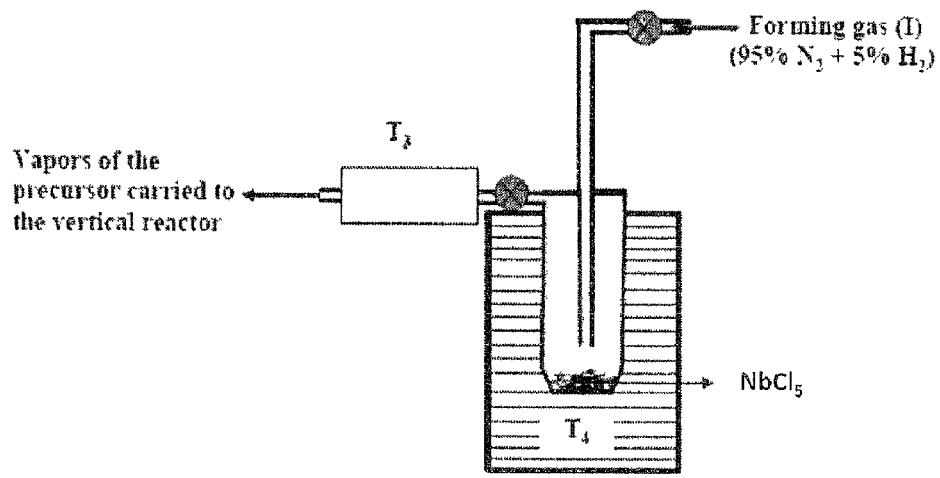
FIG. 24 shows an auxiliary suspender for the volatile precursors used in the reactor of FIG. 23.

Here instead of $ReO_3$ ($Nb_2O_5$) the more volatile halides, i.e. $ReCl_4$ and $NbCl_4$ have been used. FIG. 23 shows a reactor 12 used for this process, i.e. for the doping of IF-$MoS_2$ with Re or Nb which makes use of a supply of vaporized Re(Nb) $Cl_4$. The reactor 12 is associated with auxiliary chamber 14 or a heated bottle (see FIG. 24) for evaporation of the precursor. Here, a conduit tubing of $NbCl_4$ ($ReCl_4$) vapor is leading to the main reactor 12. The precursor $NbCl_5$ (mp 204.7° C., by 254° C.) is first heated in the auxiliary furnace 14 to a temperature of 250° C. (T4). The vapors of the heated precursor are mixed with $N_2$ (95%) $H_2$ (5%) gas (or pure $N_2$ gas) and are swept to the main reactor 12 (FIG. 23). The latter is generally similar to the reaction chambers 12 of FIG. 19, but here the precursor vapor flow is supplied in a direction towards that of the reaction gases.

Example 7

Figure 25:
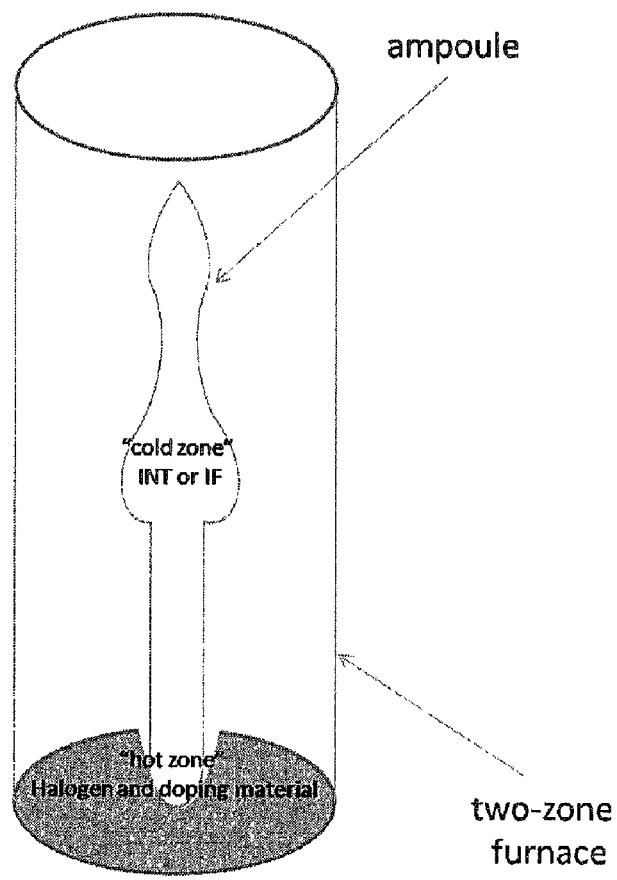
FIG. 25 shows a different reactor set-up for doping INT-WS$_2$ nanotubes in a quartz ampoule with ReCl$_4$ or NbCl$_4$.
Figure 26:
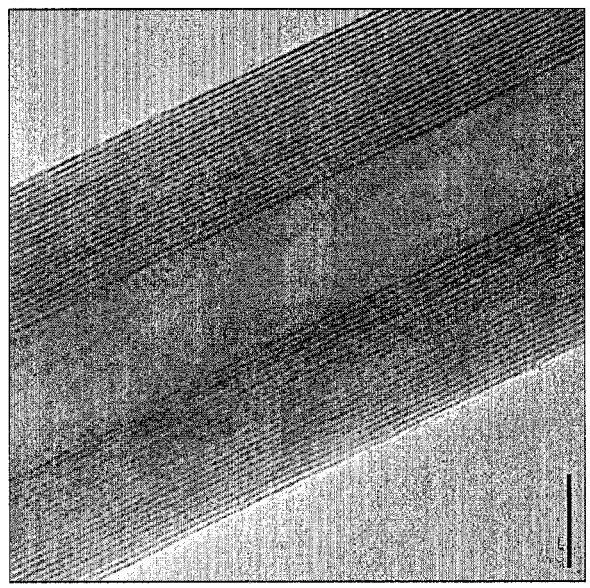
FIG. 26 shows a TEM image of the doped nanotubes obtained in the reactor depicted in FIG. 25.

Here, the doping of prepared INT-$WS_2$ (nanotubes) was made in a closed quartz ampoule as illustrated in FIG. 25. The ampoule 200 was placed in a two-zone furnace 22 allowing reaction materials to react for different periods of time (18h and more) at different temperatures (from 800 to 600° C. in a relatively "cold zone" 40) with the growth zone (or "hot zone") 50 at 950° C. (or less). The temperature gradient is intended to prevent back transport of the product. At the end of the reaction, the ampoule was cooled by water with ice, to quench the reaction at once. The total charge of the INT-WS$_2$ was maximum 250 mg. The stoichiometrically determined weight of the doping material (ReCl$_4$ and NbCl$_4$) was added to the load. In the present reaction iodine serves as the transport agent of the dopant atoms. The quartz ampoule 200 containing I$_2$ (less than 1 mg/cm$^3$), ReO$_3$ (at the bottom of the ampoule) and INT-WS$_2$ (at the middle of the ampoule) was cooled with liquid nitrogen, evacuated to 10 Torr and sealed. The rhenium composition x was determined by EDS analyzer mounted on both the SEM and TEM. FIG. 26 shows a typical TEM image of the doped nanotubes. The nanotubes appear to be very similar to the undoped ones in terms of crystalline perfection, but they are somewhat more sensitive to beam damage.

In another related experiment, ReCl$_4$ was placed in the bottom of the ampoule (instead of ReO$_3$). This experiment led to improved doping characteristics of the nanotubes. The reason being that not only Re but also the chlorine served as an n-type dopant, due to the substation of the tungsten atoms in the nanotube lattice.

Example 8

Figure 27:
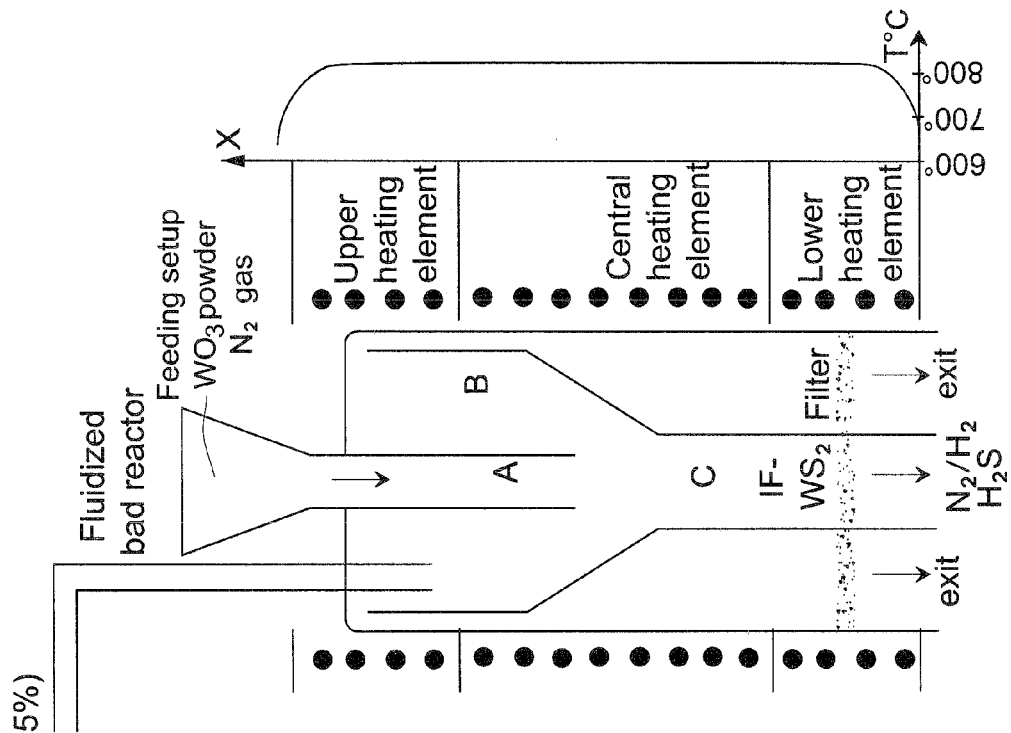
FIG. 27 shows a modified fluidized bed reactor for synthesis of IF and INT-doped materials.

Reference is made to FIG. 27 showing a modified fluidized bed reactor 10 with upper tubing (feeder) 60 which supplies ReCl$_4$ vapor to the main reactor 12 configured as described in ref. [11] for undoped IF and INT nanoparticles. The auxiliary reactor whereby this mixture is prepared was described above with reference to FIG. 24. A feeder setup 70 supplies WS$_2$ nanotubes into the fluidized bed reactor 12 in a rate of 20-100 mg/minutes, and they undergo doping in the reactor. Alternatively, the INT-WS2 powder can be placed on the filter and the gas fluidize it providing also reducing atmosphere which protects the nanotubes against oxidation.

The following is the characterization of the Re and Nb doped IF and INT. Low resistivity was measured and also very good tribological behavior was observed for the doped nanoparticles. Such nanoparticles provide very good dispersion in oil lubricants due to the extra charge on their surfaces. Furthermore, the charged nanoparticles get rid of static charge accumulated.

Example 9

In this example the above-described reactor of FIG. 27 is used to synthesize the Re (Nb) doped WS$_2$ nanotubes from their precursors. The precursors are WO$_3$ powder fed from above (or reduced WO$_{2.9}$ oxide made of elongated shaped nanoparticles). A mixture of H$_2$S gas and a reducing (forming) gas containing N$_2$ (95%) and H$_2$(5%) is flown from below to fluidize the nanoparticles. At the same time, a supply of ReCl$_4$ (NbCl$_4$) is provided from an auxiliary system as described above with reference to FIG. 24. Re (Nb) doped WS$_2$ nanotubes are thus obtained.

The invention claimed is:

1. A process for the manufacture of nanostructures each having the formula A$_{1-x}$-B$_x$-chalcognide wherein A is a metal or transition metal or an alloy of one metals or transition metals including at least one of the following: Mo, W, Re, Ti, Zr, Hf, Nb, Ta, Pt, Ru, Rh, In, Ga, InS, InSe, GaS, GaSe, WMo, TiW; B is a metal or transition metal selected from the following: Si, Nb, Ta, W, Mo, Sc, Y, La, Hf, Ir, Mn, Ru, Re, Os, V, Au, Rh, Pd, Cr, Co, Fe, Ni; and x≦0.3, provided that within said nanostructure A is not zero and A≠B; and having B and B-chalcognide doped within the A$_{1-x}$-chalcognide; the process comprising:
    providing A-Y$_1$ and B-Y$_2$ compositions each in vapor phase, Y$_1$ and Y$_2$ being the same or different halogens selected from chlorine, bromine or iodine;
    flowing said A-Y$_1$ and B-Y$_2$ vapors together with a reducing agent carrying forming gas into a reaction chamber where they meet an opposite direction flow of a chalcognide carrying reacting gas, thereby causing occurrence of reduction of the A and B metals or transition metals followed by a reaction with the chalcognide carrying reacting gas resulting in the formation of said nanostructures.

2. A process according to claim 1, wherein the provision of A-Y$_1$ and B-Y$_2$ compositions in vapor phase comprises one of the following: evaporating A-Y$_1$ and B-Y$_2$ compositions in a chamber separate from said reaction chamber; evaporating A-Y$_1$ and B-Y$_2$ compositions in two chambers, respectively, separate from said reaction chamber.

3. A process of forming a nanostructured electrical conductor, the method comprising carrying out the process of claim 1, wherein said A chalcognide precursor is a semiconductor of a certain electrical conductivity, the IF nanoparticles manufactured from said precursor having a higher electrical conductivity.

* * * * *

UNITED STATES PATENT AND TRADEMARK OFFICE
CERTIFICATE OF CORRECTION

PATENT NO. : 8,329,138 B2
APPLICATION NO. : 12/721113
DATED : December 11, 2012
INVENTOR(S) : Reshef Tenne et al.

It is certified that error appears in the above-identified patent and that said Letters Patent is hereby corrected as shown below:

In the Claims:

In Col. 28, line 15, "having the formula $A_{1-x}$-$B_x$-chalcognide" should be
--having the formula $A_{1-x}$-$B_x$-chalcogenide--.

In Col. 28, line 23, "B-chalcognide doped within the $A_{1-x}$- chalcognide;" should be
--B-chalcogenide doped within the $A_{1-x}$-chalcogenide;--.

In Col. 28, line 27, "selected from chlorine, bromine or iodine;" should be
--selected from chlorine, bromine and iodine;--.

In Col. 28, lines 30-31, "chalcognide" should be --chalcogenide--.

In Col. 28, line 33, "chalcognide" should be --chalcogenide--.

In Col. 28, line 44, "chalcognide" should be --chalcogenide--.

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,329,138 B2
APPLICATION NO. : 12/721113
DATED : December 11, 2012
INVENTOR(S) : Reshef Tenne et al.

Page 1 of 1

It is certified that error appears in the above-identified patent and that said Letters Patent is hereby corrected as shown below:

In the Claims:

In col. 28, line 22, "A is not zero" should be --X is not zero--.

Signed and Sealed this
Seventeenth Day of September, 2013

Teresa Stanek Rea
*Deputy Director of the United States Patent and Trademark Office*